Figure 1:
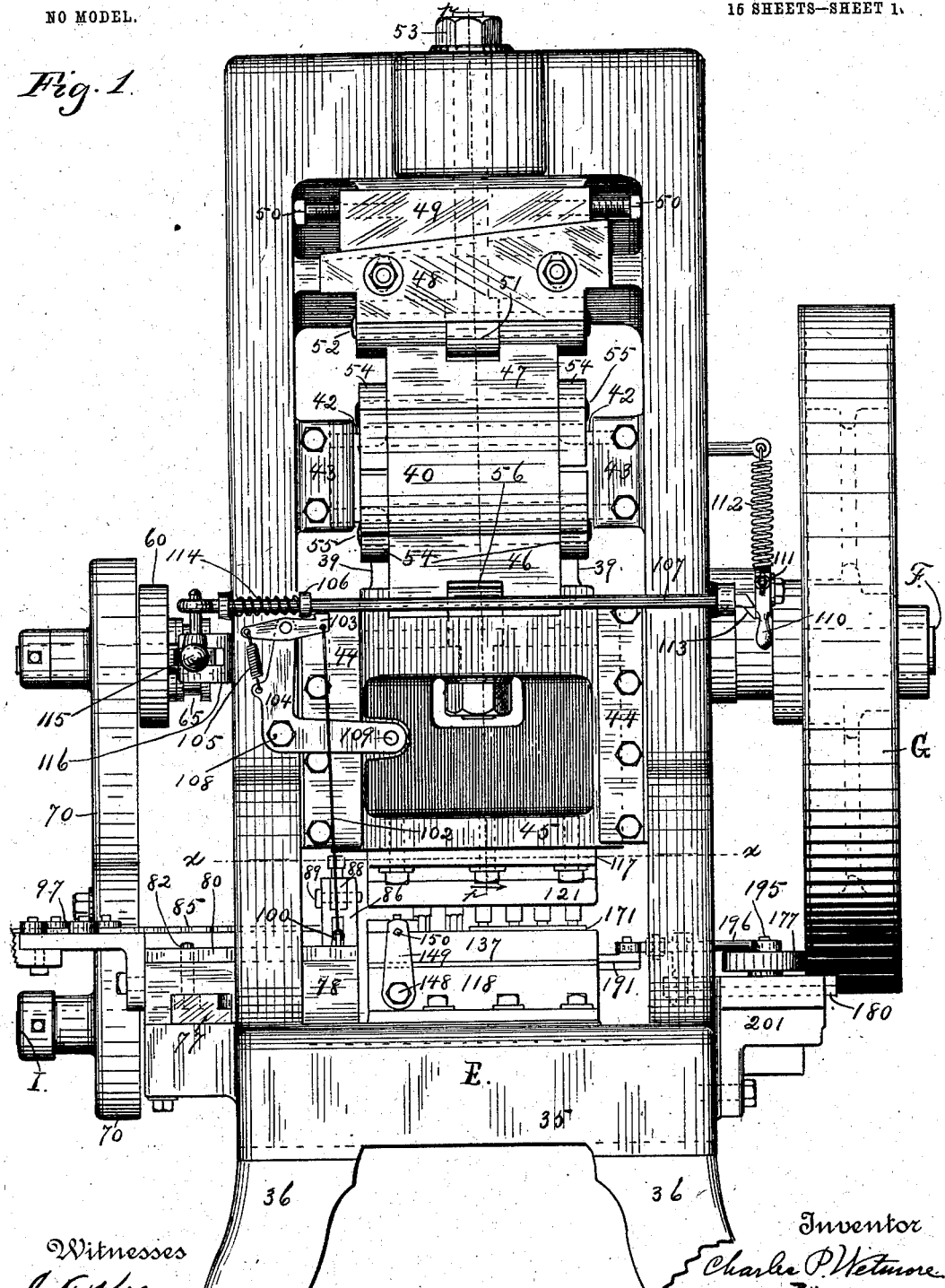

No. 729,822. PATENTED JUNE 2, 1903.
C. P. WETMORE.
NUT MACHINE.
APPLICATION FILED JULY 11, 1902.
NO MODEL. 15 SHEETS—SHEET 1.

Witnesses
C. F. Kilgore
S. H. Clarke

Inventor
Charles P. Wetmore
By James Shepard
Attorney

No. 729,822. PATENTED JUNE 2, 1903.
C. P. WETMORE.
NUT MACHINE.
APPLICATION FILED JULY 11, 1902.
NO MODEL. 15 SHEETS—SHEET 3.

Witnesses
C. F. Kelgm
S. H. Clarke

Inventor
Charles P. Wetmore
By James Shepard
Attorney

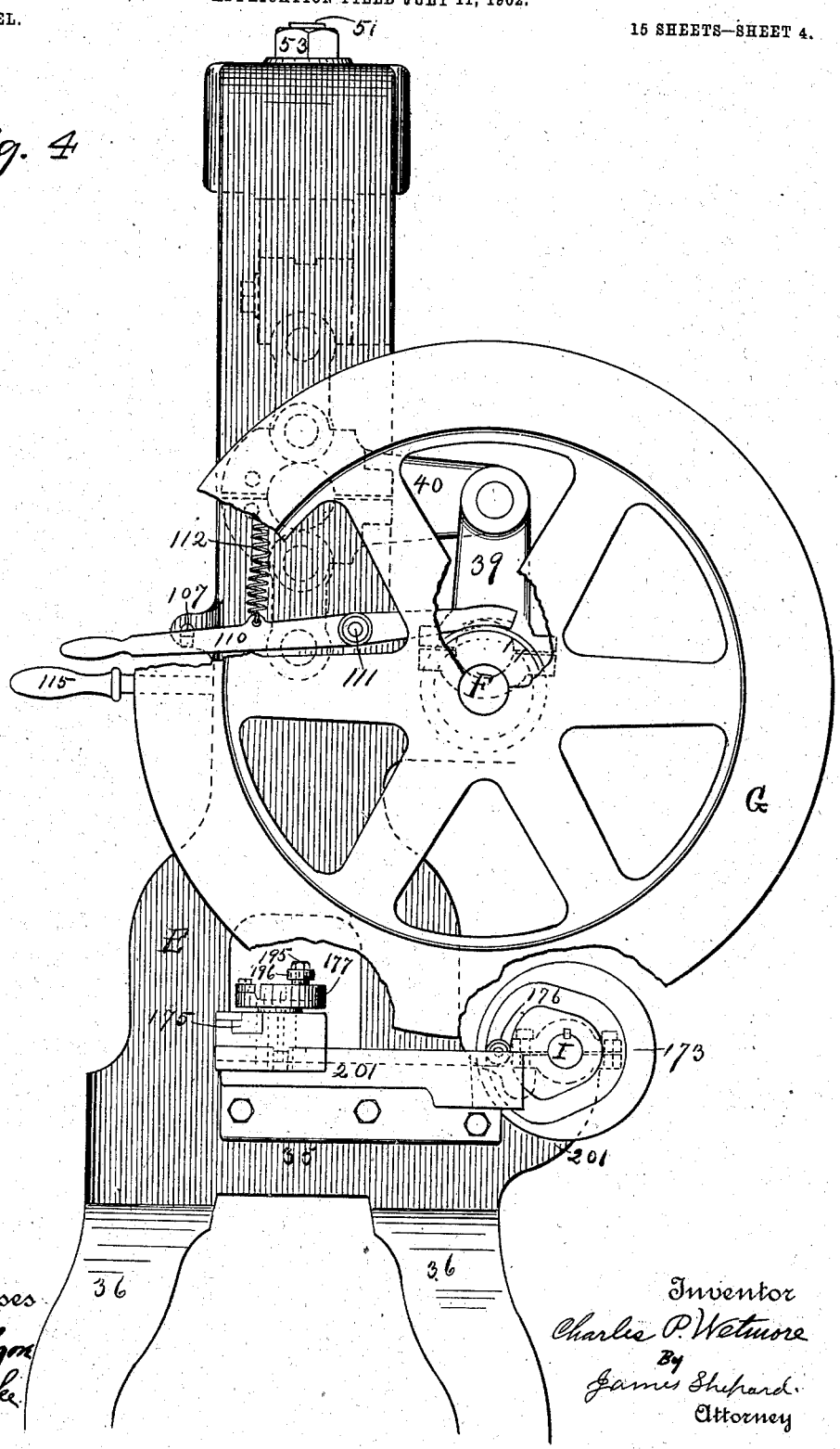

No. 729,822. PATENTED JUNE 2, 1903.
C. P. WETMORE.
NUT MACHINE.
APPLICATION FILED JULY 11, 1902.
NO MODEL. 15 SHEETS—SHEET 5.
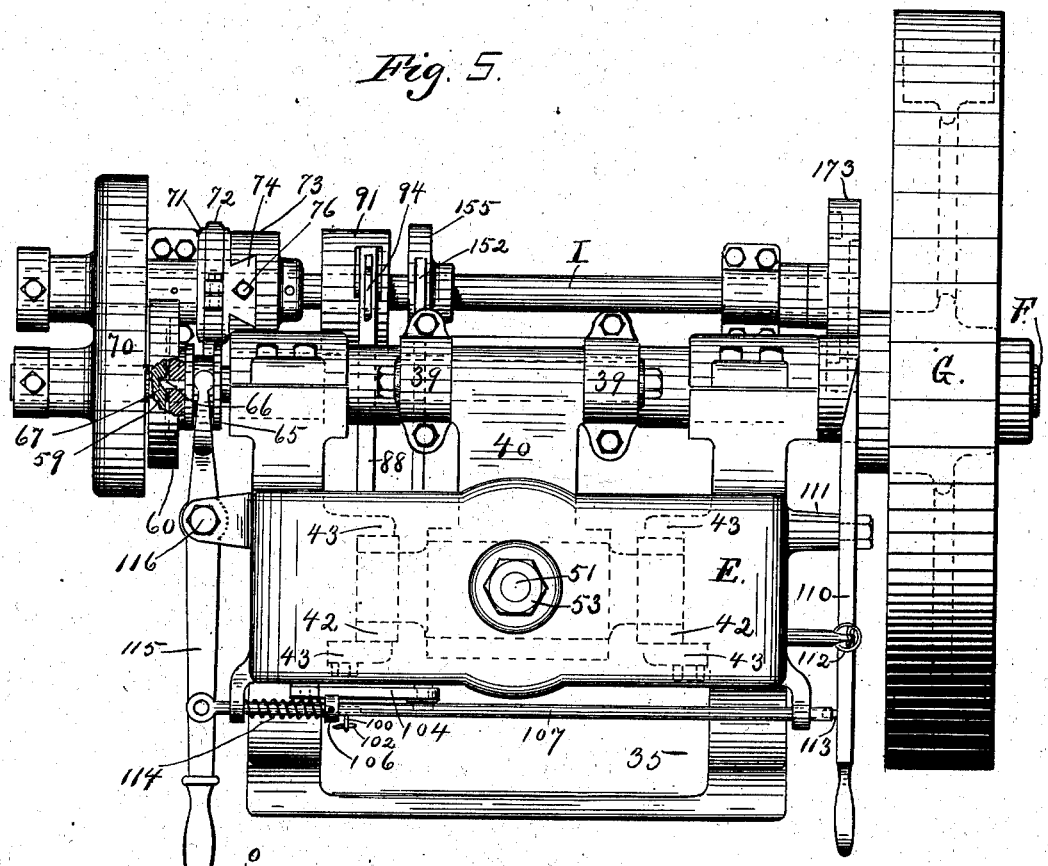
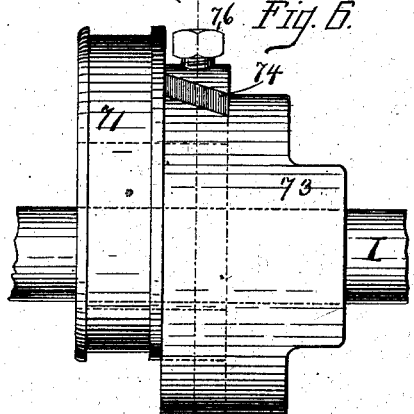
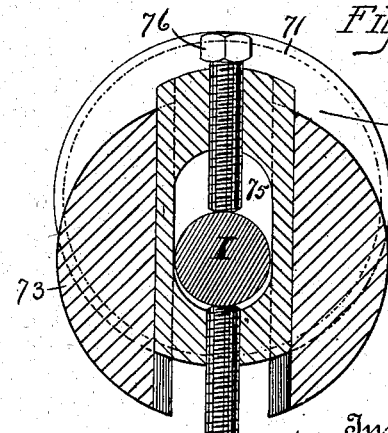
Witnesses
C. F. Kilgore
S. H. Clarke
Inventor
Charles P. Wetmore
By James Shepard
Attorney No. 729,822. PATENTED JUNE 2, 1903.
C. P. WETMORE.
NUT MACHINE.
APPLICATION FILED JULY 11, 1902.
NO MODEL. 15 SHEETS—SHEET 6.

Witnesses
C. F. Kilgore
S. H. Clarke

Inventor
Charles P. Wetmore
By
James Shepard
Attorney

No. 729,822. PATENTED JUNE 2, 1903.
C. P. WETMORE.
NUT MACHINE.
APPLICATION FILED JULY 11, 1902.
NO MODEL. 15 SHEETS—SHEET 7.
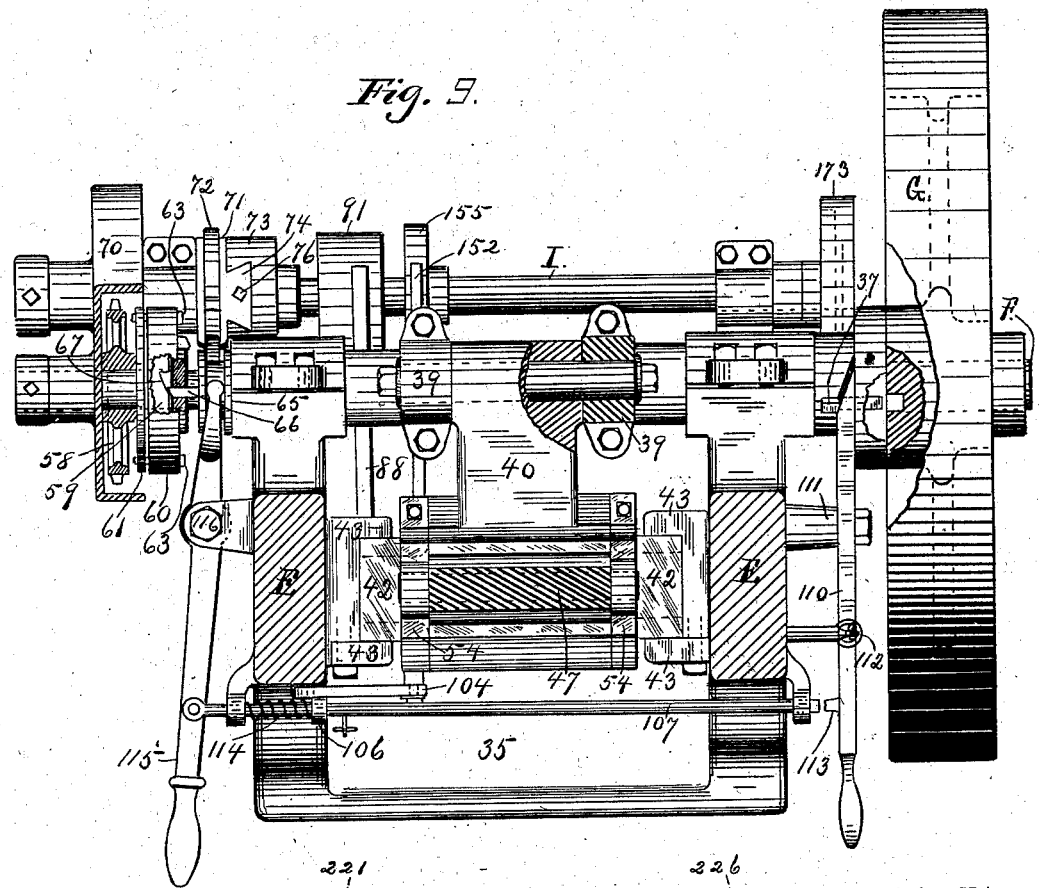
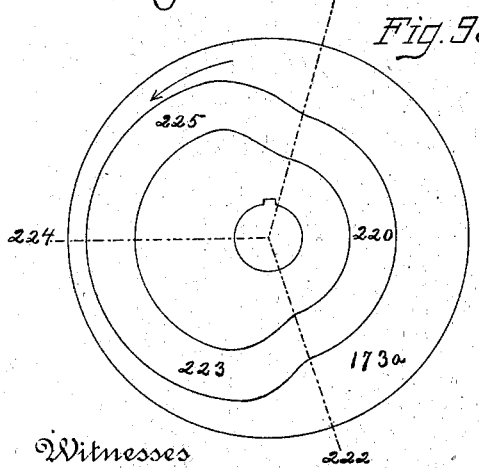
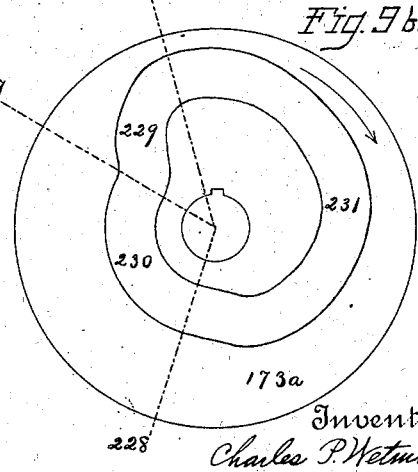
Witnesses
C. F. Kilgore
S. H. Clarke
Inventor
Charles P. Wetmore
By James Shepard
Attorney No. 729,822. PATENTED JUNE 2, 1903.
C. P. WETMORE.
NUT MACHINE.
APPLICATION FILED JULY 11, 1902.
NO MODEL. 15 SHEETS—SHEET 8.

Witnesses
C. F. Kilgore
S. H. Clarke

Inventor
Charles P. Wetmore
By James Shepard
Attorney

THE NORRIS PETERS CO., PHOTO-LITHO., WASHINGTON, D. C.

No. 729,822. PATENTED JUNE 2, 1903.
C. P. WETMORE.
NUT MACHINE.
APPLICATION FILED JULY 11, 1902.
NO MODEL. 15 SHEETS—SHEET 9.
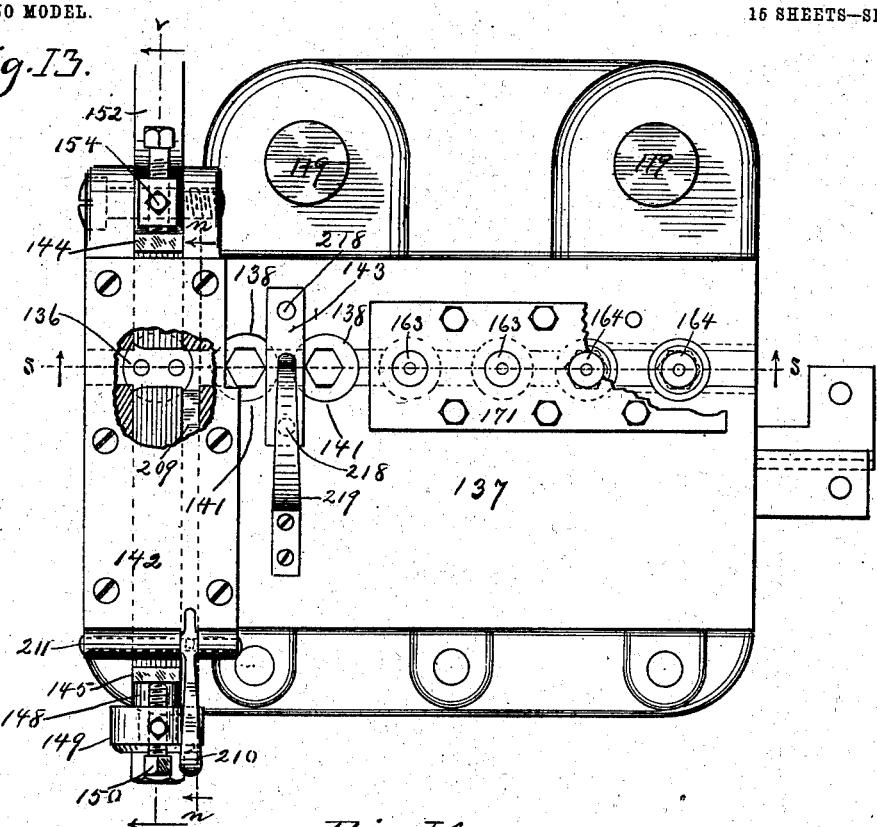
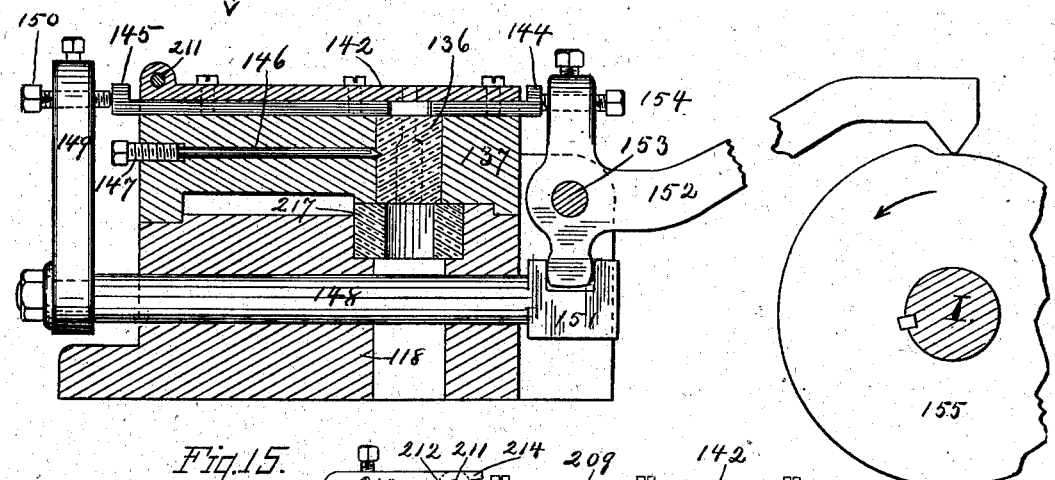
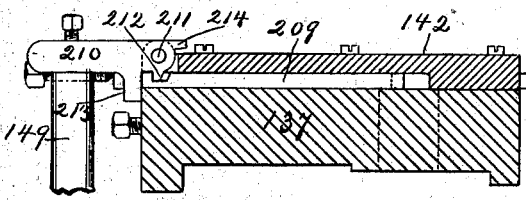
Witnesses
C. F. Kilgor
S. H. Clarke
Inventor
Charles P. Wetmore
By
James Shepard
Attorney No. 729,822. PATENTED JUNE 2, 1903.
C. P. WETMORE.
NUT MACHINE.
APPLICATION FILED JULY 11, 1902.
NO MODEL. 15 SHEETS—SHEET 10.

Witnesses
C. F. Kilgore
S. H. Clarke

Inventor
Charles P. Wetmore
By James Shepard
Attorney

No. 729,822. PATENTED JUNE 2, 1903.
C. P. WETMORE.
NUT MACHINE.
APPLICATION FILED JULY 11, 1902.
NO MODEL. 15 SHEETS—SHEET 11.
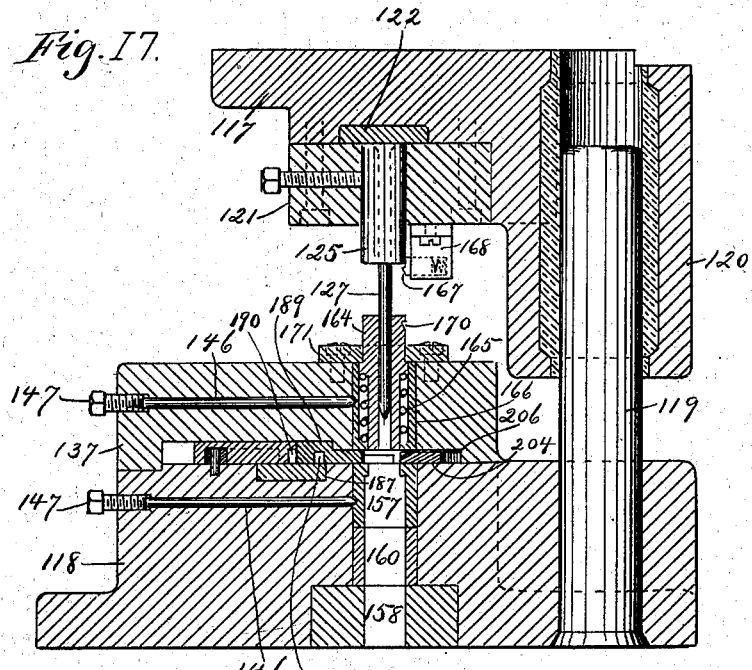
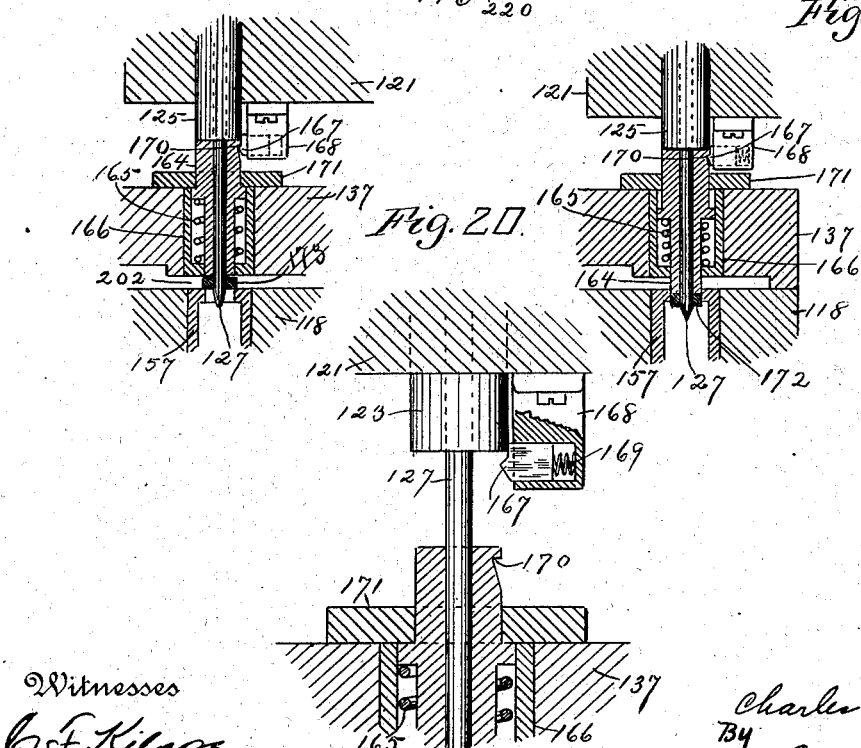

No. 729,822. PATENTED JUNE 2, 1903.
C. P. WETMORE.
NUT MACHINE.
APPLICATION FILED JULY 11, 1902.
NO MODEL. 15 SHEETS—SHEET 12.
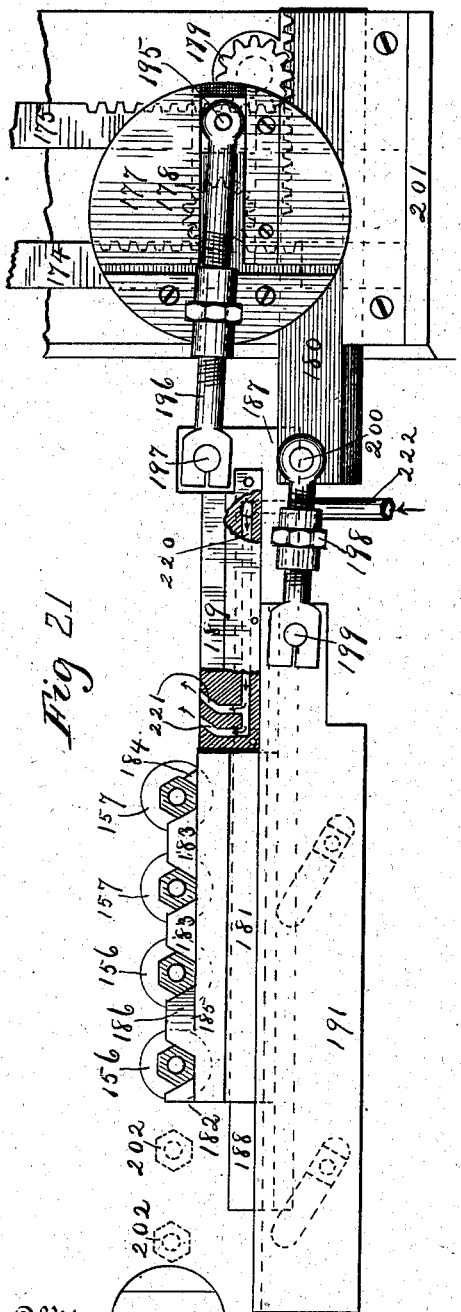
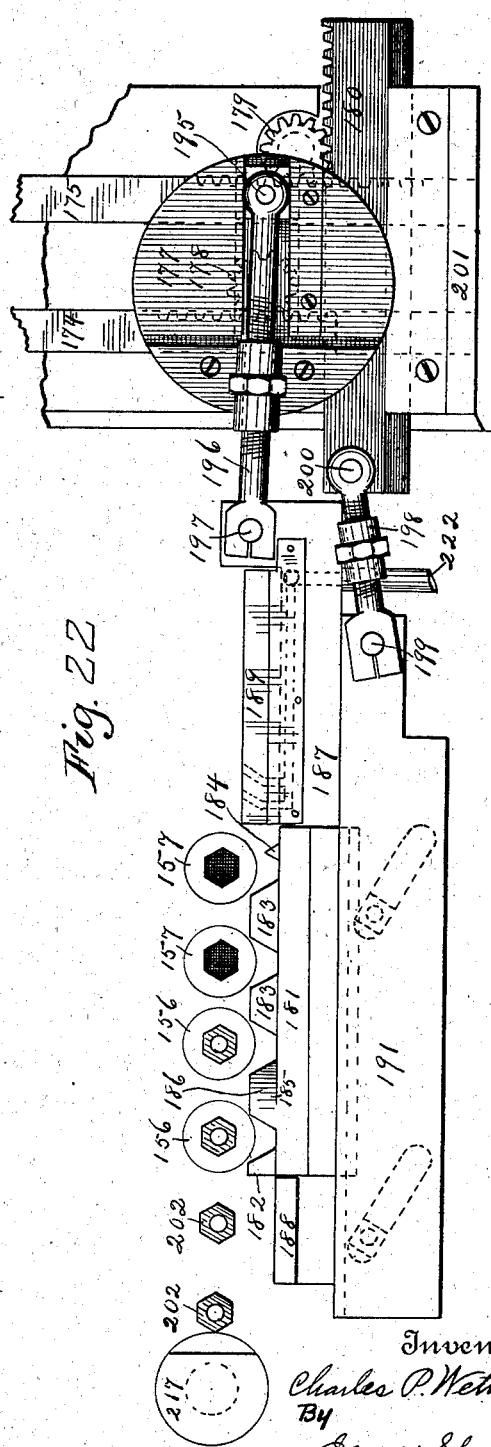
Witnesses
C. F. Kilgore
S. H. Clarke
Inventor
Charles P. Wetmore
By
James Shepard
Attorney No. 729,822. PATENTED JUNE 2, 1903.
C. P. WETMORE.
NUT MACHINE.
APPLICATION FILED JULY 11, 1902.
NO MODEL. 15 SHEETS—SHEET 13.
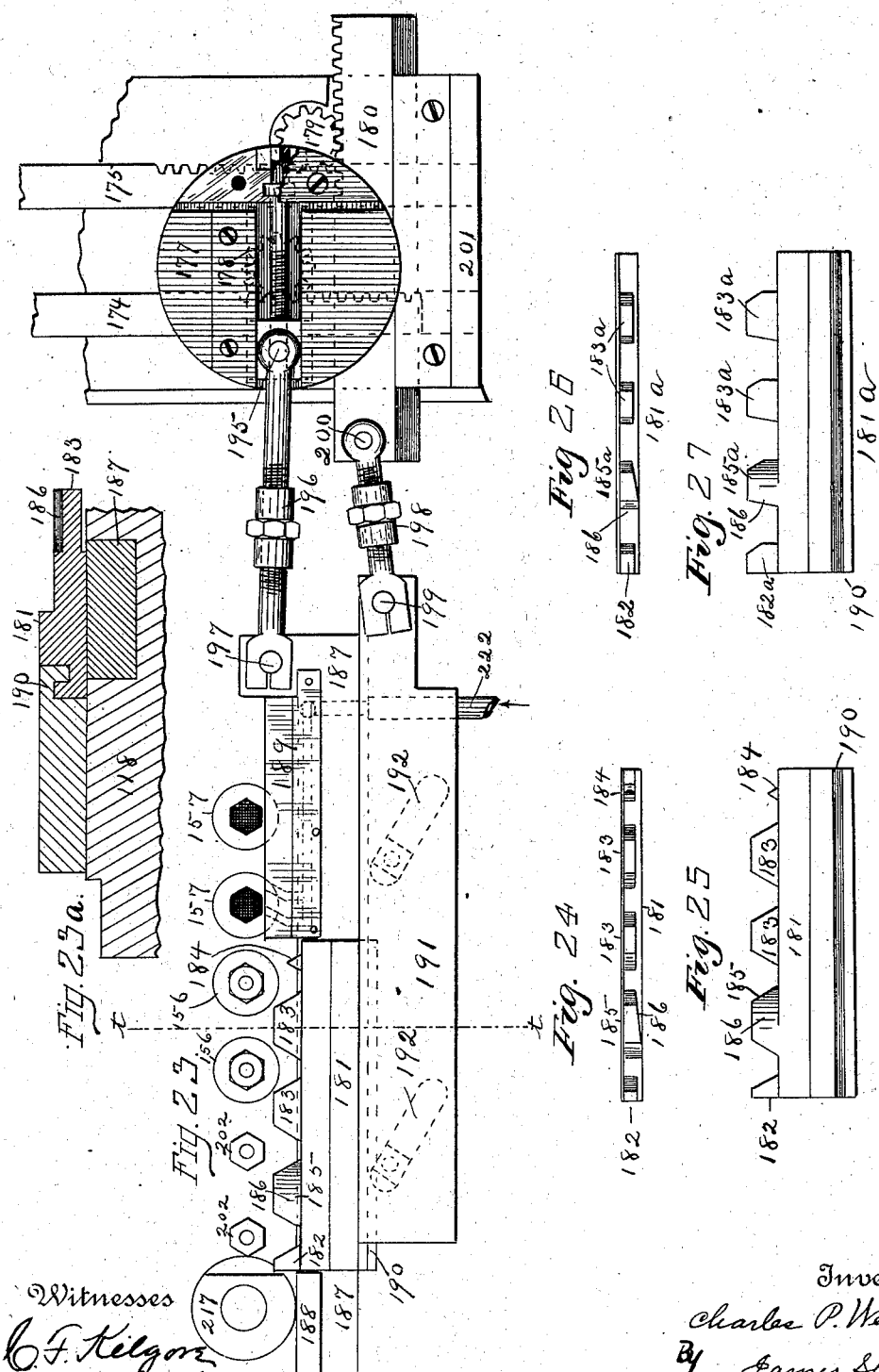
Witnesses
C. F. Kilgore
S. H. Clarke
Inventor
Charles P. Wetmore
By James Shepard
Attorney No. 729,822. PATENTED JUNE 2, 1903.
C. P. WETMORE.
NUT MACHINE.
APPLICATION FILED JULY 11, 1902.
NO MODEL. 15 SHEETS—SHEET 14.
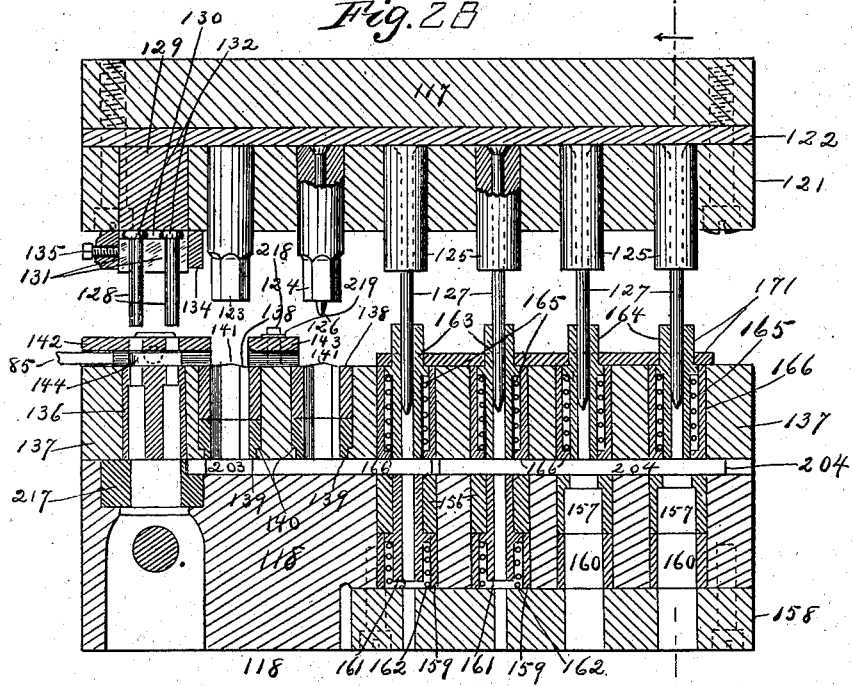

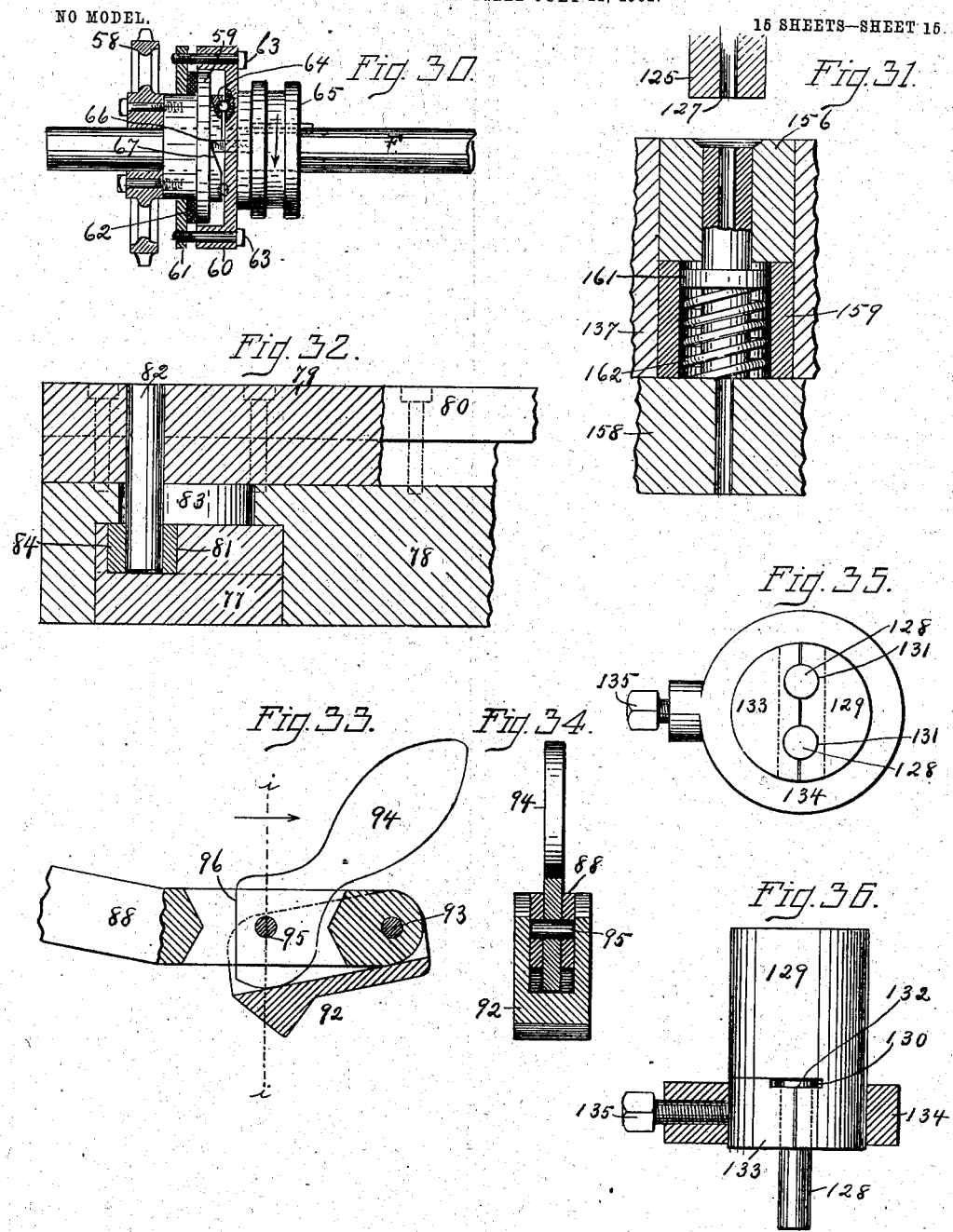

No. 729,822. Patented June 2, 1903.

UNITED STATES PATENT OFFICE.

CHARLES P. WETMORE, OF NEW BRITAIN, CONNECTICUT, ASSIGNOR TO RUSSELL & ERWIN MANUFACTURING COMPANY, OF NEW BRITAIN, CONNECTICUT.

NUT-MACHINE.

SPECIFICATION forming part of Letters Patent No. 729,822, dated June 2, 1903.

Application filed July 11, 1902. Serial No. 115,229. (No model.)

*To all whom it may concern:*

Be it known that I, CHARLES P. WETMORE, a citizen of the United States, residing in New Britain, in the county of Hartford and State of Connecticut, have invented certain new and useful Improvements in Nut-Machines, of which the following is a specification.

My invention relates to improvements in nut-machines; and the objects of my improvement are simplicity and economy in construction, efficiency in operation, and rapidity in the production of the finished nuts.

Figure 2:
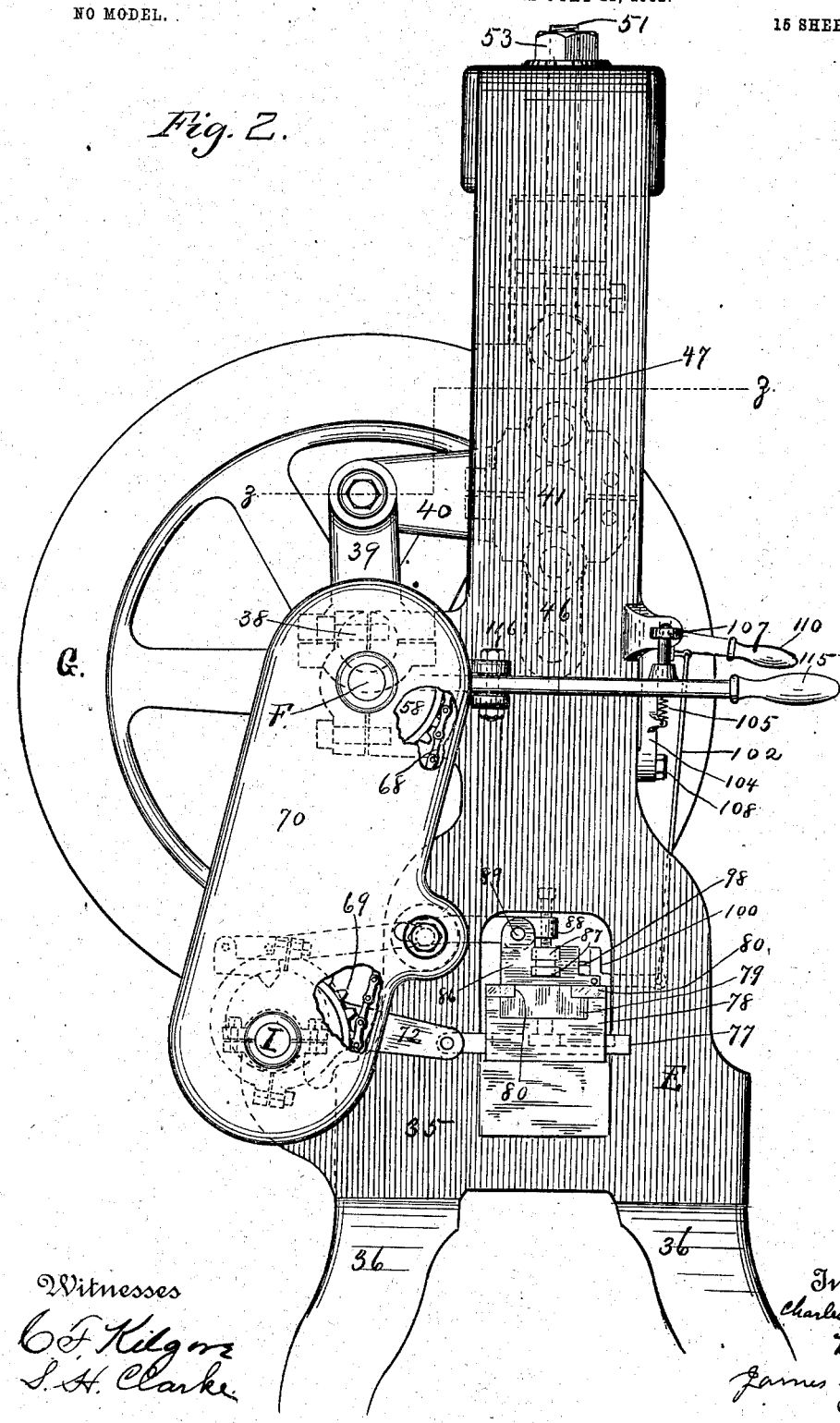
Figure 3:
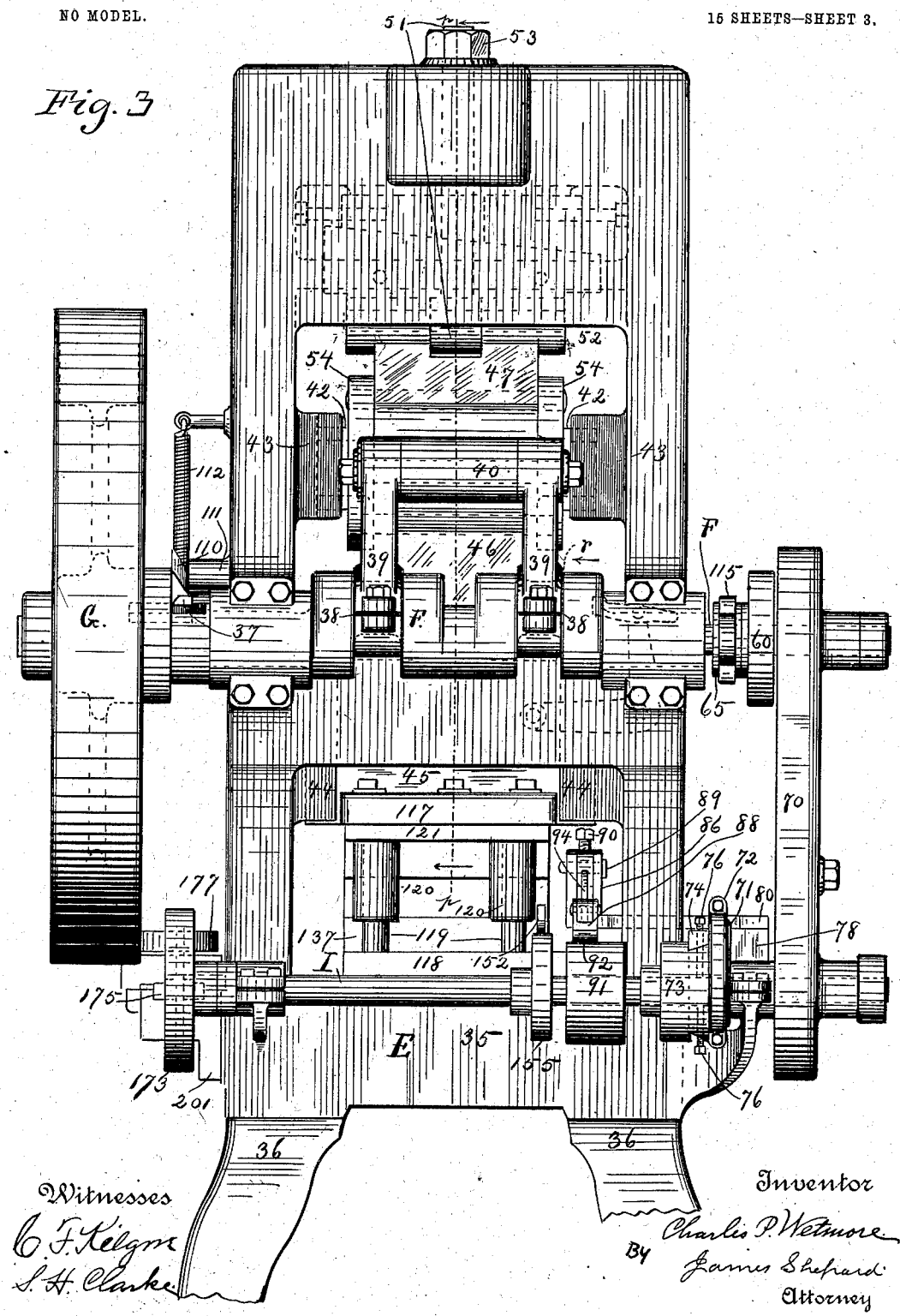
Figure 8:
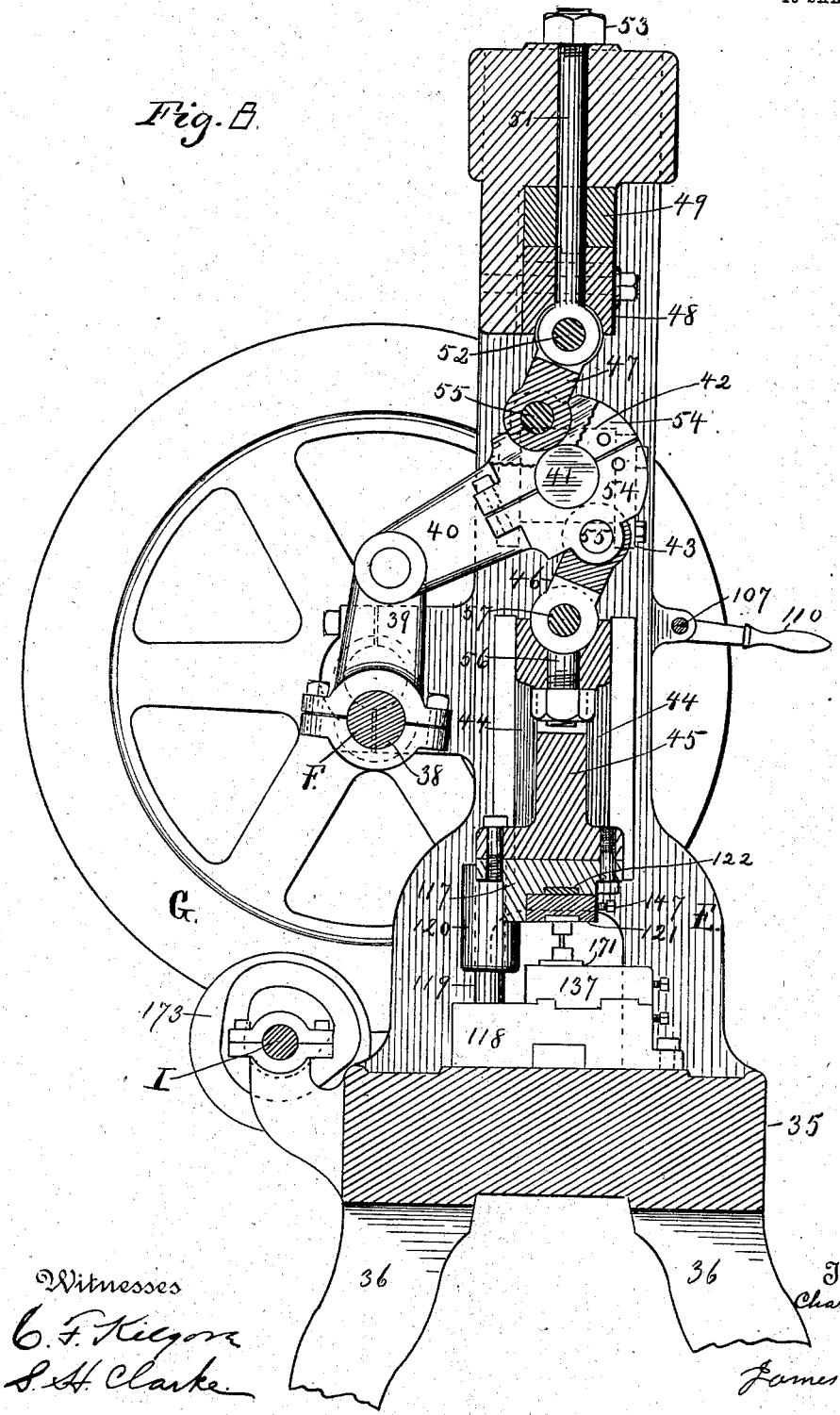
Figure 10:
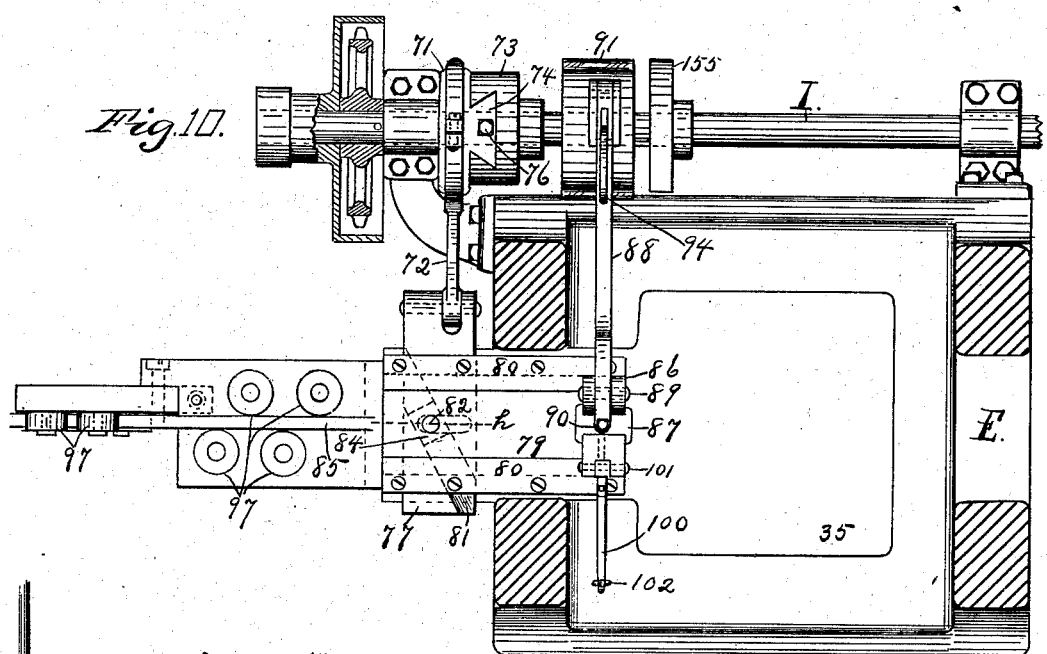
Figure 11:
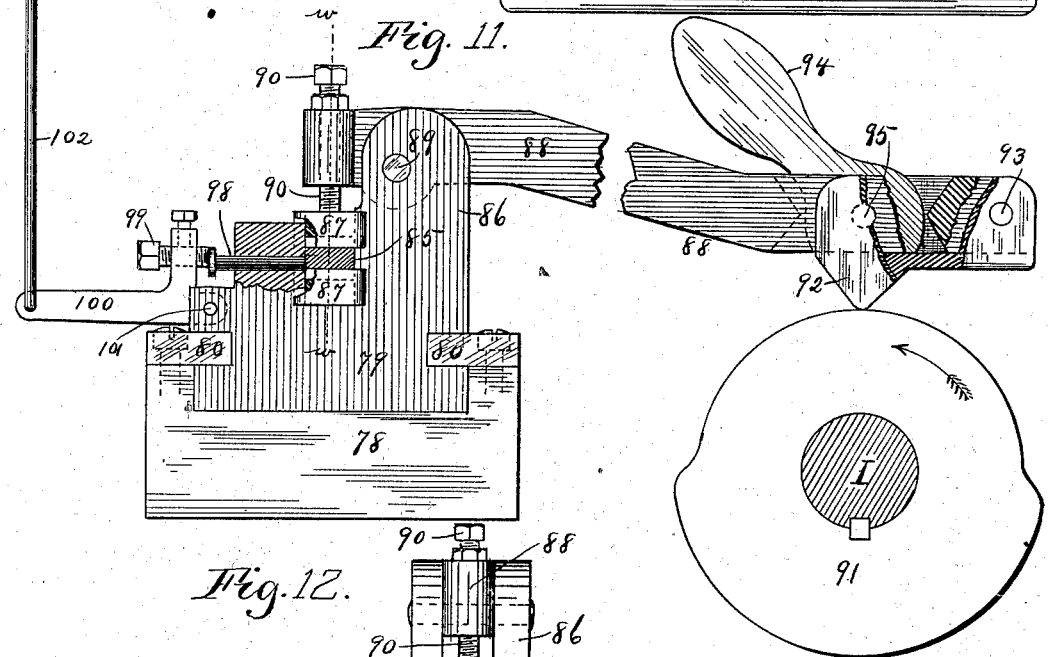
Figure 12:
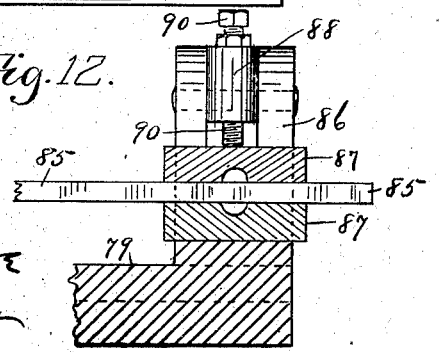
Figure 16:
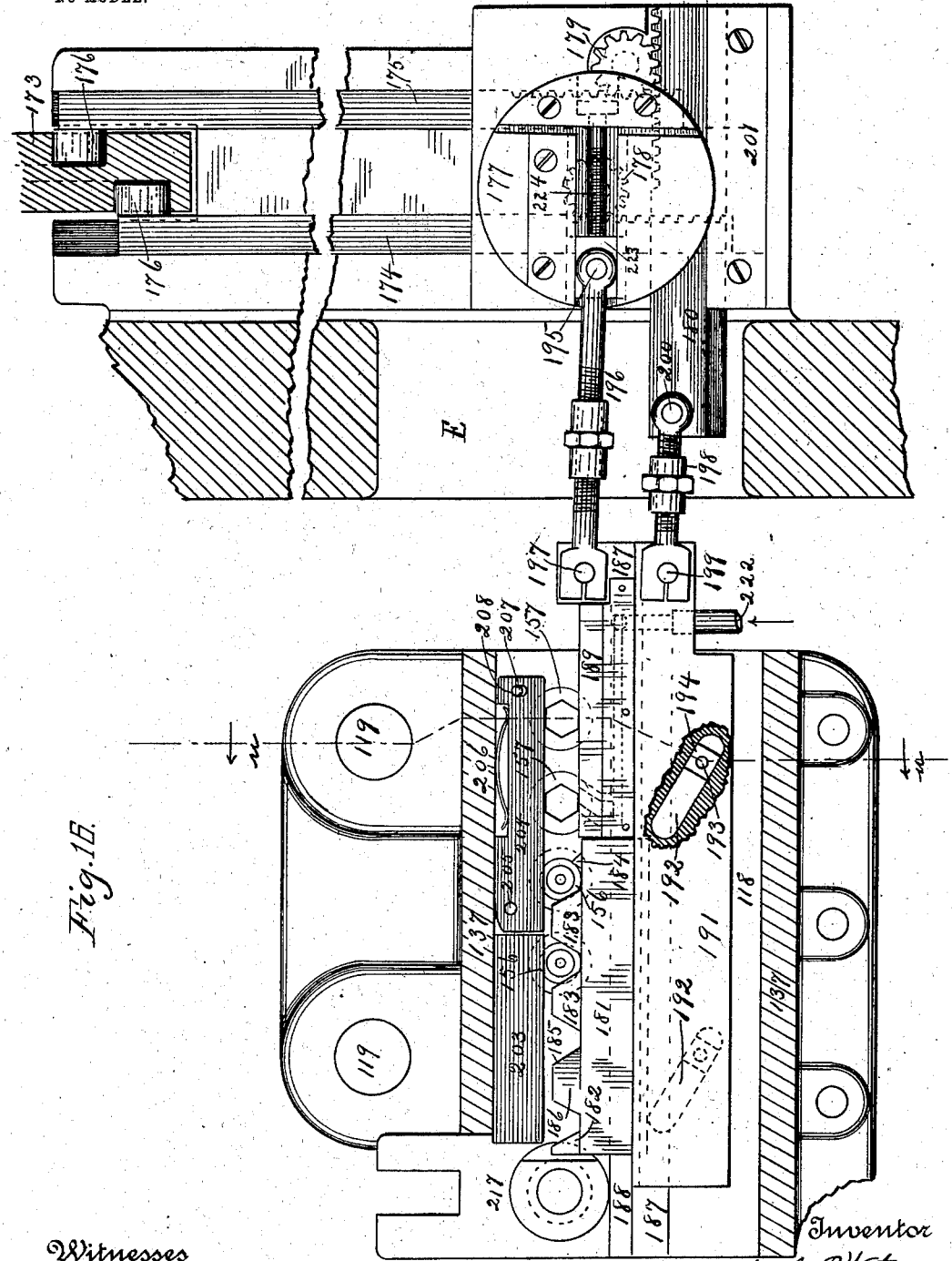

In the accompanying drawings, Figure 1 is a front elevation of my nut-machine. Fig. 2 is a side elevation of the same, showing the left-hand side. Fig. 3 is a rear elevation of the same. Fig. 4 is a side elevation of the same, showing the right-hand side. Fig. 5 is a plan view of the same. Fig. 6 is an enlarged side elevation of the adjustable eccentric for the feed. Fig. 7 is a sectional view of the same on the line $o\ o$ of Fig. 6. Fig. 8 is a sectional view on the line $p\ p$ of Figs. 1 and 3 on a smaller scale, the main shaft being sectioned on the line $r$ of Fig. 3, some of the parts being shown in elevation. Fig. 9 is a sectional plan of the same mainly on the line $z\ z$ of Fig. 2. Fig. 9$^a$ is a side elevation of a modified carrier-cam. Fig. 9$^b$ is a side elevation of the opposite side of the said cam. Fig. 10 is a sectional plan of parts of the machine, the frame being sectioned on the line $x\ x$ of Fig. 1, illustrating mainly the feeding mechanism. Fig. 11 is an enlarged side elevation, partly in vertical section, showing more particularly the stock-clamping devices of the feed mechanism as viewed from the right-hand side of Fig. 10. Fig. 12 is a sectional view, partly in elevation, of a portion of the same on the line $w\ w$ of Fig. 11. Fig. 13 is a plan view of the die-bed and connected parts, partly in broken-out section. Fig. 14 is a vertical section on the line $v\ v$ of Fig. 13. Fig. 15 is a sectional view of parts on the line $n$ of Fig. 13, showing the hand-operated stop and its lever in side elevation. Fig. 16 is a sectional plan view of the die-bed, the carrier, and the carrier-operating mechanism. Fig. 17 is a vertical section, partly in elevation, of the dies and punches, &c., on the line $u\ u$ of Figs. 16 and 28. Fig. 18 is a like view of a portion of the same in a different position. Fig. 19 is a like view of the same in a still different position. Fig. 20 is an enlarged view of the same in a still different position and with the catch-socket in section. Fig. 21 is a plan view of the nut-carrier and part of its operating mechanism, together with a diagrammatic view of the dies and their work. Fig. 22 is a like view of the same with the parts in a different position. Fig. 23 is a like view of the same with the parts in a still different position. Fig. 23$^a$ is an enlarged sectional view on the line $t\ t$, Fig. 23. Fig. 24 is a detached edge view of the carrier on the same scale as Fig. 23, but turned over bottom side up. Fig. 25 is a plan view of the same. Fig. 26 is a detached edge view of a carrier for square nuts. Fig. 27 is a plan of the same. Fig. 28 is a vertical section of the dies and punches on the line $s\ s$ of Fig. 13, the same being partly in elevation. Fig. 29 is a diagrammatic view of the central hole-punches, the blanking-out punches, and their work. Fig. 30 is a sectional plan of the frictional driver for the feed-shaft. Fig. 31 is a central vertical section of the crowning-die with its knock-out in the depressed position. Fig. 32 is a vertical section of part of the feed mechanism on the line $h$ of Fig. 10. Fig. 33 is a sectional side elevation of the feed grip-lever and its cam-ball. Fig. 34 is a transverse section of same, partly in elevation, on the line $i\ i$, Fig. 33. Fig. 35 is a reverse plan view of the piercing-punches and their holder. Fig. 36 is a sectional side elevation of the same.

E designates the frame of the machine, provided with a bed 35, to the under side of which any suitable legs 36 may be secured, the said legs being only partially shown. At the rear of the frame E is the main shaft F, carrying the driving-wheel G, loose thereon, but connected therewith for driving by an ordinary clutch-pin 37, Fig. 9. The middle portion of the said shaft F is provided with two cranks 38, upon which the pitmen 39 are mounted. The upper ends of these pitmen are connected with the main toggle-lever 40, having trunnions 41, Fig. 8, which trunnions are mounted in sliding blocks 42, that rest in vertical ways 43 inside of the frame E, which ways are in alinement with the ways 44 of the press-slide 45. The main toggle-lever 40 is connected with the press-slide 45 by means of the lower toggle-lever 46 and to the frame E of the press or machine by means of the upper toggle-lever 47. The upper end of this toggle-lever 47 takes its bearing in the under side of a vertically-adjustable block 48, the upper side of which is tapered, as shown in Fig. 1, and above the said block and between the same and the upper part of the frame is a tapering block 49, adjustable endwise by means of the screws 50, that pass into threaded holes in the ends of said block, while the heads of the said screws bear upon the frame, as shown. Adjusting the block lengthwise adjusts the block 48 up or down to vary the bearing or abutment for the upper toggle-lever 47. The said upper toggle-lever is held in engagement with the block 48 by means of an eyebolt 51, that serves as a hinge-lug for the pintle 52 at the upper end of the said toggle-lever. The said eyebolt passes through the upper part of the press-frame and is provided with a nut 53 for changing its position and for holding it in place under the varying adjustments of the block 48. The toggle-levers 46 and 47 are connected to the main toggle-lever 40 by means of ears or caps 54, that embrace the trunnions 41 and are secured to the ends of the hub of the said lever 40. The ends of the toggle-levers 46 and 47 rest in suitable sockets in the upper and lower sides of the lever 40, and pintles 55 pass through the said ends and the ears or caps 54, as best shown in Figs. 1 and 8. The lower toggle-lever is connected to the press-slide 45 by means of the eyebolt 56 and pintle 57.

As the shaft F revolves through its cranks and imparts movement to the pitmen 39, the said pitmen rock the main toggle-lever 40 on its trunnions, and thereby deflect the toggle-levers, as shown in Fig. 8, to raise the press-slide and then to straighten them, as indicated by broken lines in Figs. 2 and 4, to lower the press-slide to its lowermost position, the trunnions of the main toggle-lever moving up and down in alinement with the slide as it moves up and down. This mechanism for operating the press-slide is particularly useful in a nut-machine, especially when duplicate series of operations are going on at the same time, and two or more complete nuts are made at every revolution of the main shaft, as hereinafter described, because with the mechanism hereinbefore described the most powerful part of the stroke is at its end when the toggles are coming into direct alinement with the slide.

Near the end of the main shaft F is a sprocket-wheel 58, loose on the shaft, but driven therewith by means of a friction-driver and automatic stop mechanism. The said wheel is bolted to or may be formed on the friction-hub, having a flange 59. Rigidly secured to the shaft by the side of the flange 59 is a hub-inclosing case 60, and surrounding the hub of the flange 59 is an annular plate 61, that is secured to the case 60 by means of bolts 63 and so as to embrace a friction-washer 62, Fig. 30, of leather or other suitable material, between the flange 59 and annular plate 61 with as much friction as may be desired, the said friction being regulated by means of the screws or bolts 63. In order that the friction may be mainly between the annular plate, washer, and flange instead of between the case and end of the hub of the flange I provide some suitable antifriction devices—as, for example, a hardened washer or a series of balls 64, Fig. 30. By the side of the hub-case 60 I secure a sliding shipper-collar 65 on a spline, so as to necessarily rotate with the shaft, although it may slide thereon, and to the shipper I secure a pin 66, that extends through the hub-case 60 and bears by its end on the end of the hub of the flange 59 and normally within a notch 67, inclined on its forward side, as shown in Fig. 30. It is not necessary to secure the pin 66 to the shipper-collar 65. It may lie loosely in the case 60 with its ends abutting, respectively, against the flanged hub 59 and the shipper-collar 65. The dart on the shipper-collar 65 indicates the direction that the said collar and shaft revolve. The friction is adjusted so as to be fully strong enough to carry the intended load, but so as to slip when anything happens that causes any material excess in the power required to drive it. In adjusting the friction the annular plate changes its position slightly on the hub of the sprocket-wheel; but the said sprocket-wheel, the flange, and the hub-case remain unchanged in their longitudinal position on the shaft. Whenever the friction-driver ceases to carry its load or excess of load, the sprocket-wheel 58 and the flanged hub 59 stop or lag behind the hub-inclosing case 60 and shipper-collar 65, whereby the incline of the notch 67 in the flanged hub 59 acts to push the shipper-collar endwise on the shaft, moving it away from the said flanged hub and changing it from the position shown in Fig. 30 to that shown in Fig. 9. The action of the shipper-collar in thus changing its position will be described in connection with the other stopping devices.

At the rear of the frame E, near its bed 35, is a counter-shaft I, carrying several cams and driven by the friction-driver before described. As shown, the necessary connection between the friction-driver is made through the sprocket-wheel 58, chain 68, and sprocket-wheel 69 on the counter or cam shaft I. For convenience and safety I inclose the said sprocket-wheels and chain in a case 70. Upon this shaft I is the adjustable eccentric 71, that actuates the feed-pitmen 72. The hub 73 of the said eccentric is rigidly secured to the shaft I in any proper manner and is dovetailed on one side or provided with other proper ways for the dovetailed slide 74 of the eccentric 71, that is received and guided therein, as best shown in Figs. 5, 6, 7, and 10. The eccentric and slide are slotted, as at 75, Fig. 7, to receive the shaft and permit of an adjustment laterally to the said shaft. The slide is provided with adjusting-screws 76, the inner ends of which bear on the shaft and hold the eccentric in whatever position thereon it may be adjusted to. The end of the feed-pitmen 72 opposite the eccentric 71 is connected to the feed-slide actuator 77, that reciprocates from front to rear through the under side of the bed 78 of the feed-slide 79. This slide 79 reciprocates from right to left in suitable ways 80. On the upper side of the feed-slide actuator 77 there is an oblique slot 81, Figs. 10 and 32, for acting upon the lower end of the pin 82, made fast in the slide 79 and passing through a slot 83 in the bed, 78, whereby the front to rear reciprocating movement of the feed-slide actuator imparts a right-and-left reciprocating movement to the feed-slide. In order to prevent wear on the lower end of the pin 82, I prefer to insert the said end into a block 84, fitted to the slot 81, as shown in Fig. 32 and indicated by broken lines in Fig. 10.

The stock from which to make the nuts may be in the form of bars; but I prefer to take the stock 85 from a coil and pass it through the straightener-rollers 97 and over the top of the feed-slide into and through the feed grip holder or standard 86. Holding-jaws 87 are held between the front and rear uprights of the said holder, between which jaws the stock 85 may pass. The lower jaw will remain stationary in the holder, while the upper one of the jaws 87 may rise and fall sufficiently to grasp and release the stock and to come together when the stock runs out. One or both of these jaws are recessed transversely, as shown in Figs. 11 and 12, sufficiently to receive between them when closed the automatic stop-pin 98, hereinafter described. The grip-lever 88 is pivoted by pin 89 in the holder 86 and provided with an adjusting-screw 90 for bearing upon the upper one of the grip or holding jaws 87 for adjustably holding the stock in the feed-slide, the said lever being actuated separately from the feed-slide by means of the grip-cam 91 on the shaft I. In order that the said lever may be thrown out of action when desired, I provide its cam end with an adjustable cam-ball 92, pivoted on the said end by the pin 93, as shown in Figs. 11, 33, and 34, and within a slot in the said lever I pivot the releasing-handle 94 on the pin 95. The head of this releasing-handle has a truncated or inclined face 96, Fig. 33, that projects from the pivot-pin 95 a less distance than does the adjacent rounded portion of the said head. The body portion of the cam-ball 92 is slotted longitudinally, so as to receive the end of the grip-lever 88 into it, and when it is in a position parallel with the end of the said lever, as shown in Fig. 11, the lower edge of the said lever rests in the bottom of the said longitudinal slot. When the releasing-handle 94 is turned into the position shown in the said Fig. 11, its inclined or truncated face 96 is parallel to the lower edge of the said lever and also rests on the bottom of the said slot, in which position the nose of the cam-ball 92 is as near the lever as it can be, so that the lever is released from the action of the said cam to such an extent that the lever has no gripping action on the holding-jaws. By turning the releasing-handle into the position shown in Figs. 33 and 34 the straight or inclined face 96 is withdrawn from the bottom of the slot in the body of the cam-ball 92 and its projecting rounded end bears thereon to force the cam-ball 92 outwardly from the lever, as shown in Fig. 33, so that the cam 91 then moves the grip-lever 88 sufficiently to firmly grasp the stock and cause the stock to be carried or fed forwardly one step at the next forward movement of the feed-slide.

The front upright of the jaw-holder 86 of the feed-slide 79 is provided with a sliding automatic stop-pin 98, the inner end of which pin normally bears against the edge of the stock 85 as it is held within the jaws 87. When the stock runs out, this pin may pass inwardly into the recess provided for it between the said jaws. This pin is pressed inwardly by means of an adjusting-screw 99 in the automatic stop-lever 100, that is pivoted in the front part of the feed-slide 79 by means of the pin 101, Fig. 11. The outer end of the automatic stop-pin is provided with a rod 102, the upper end of which rod is connected with the catch 103, Fig. 1, that is pivoted to the upper end of the angle-lever 104. A spring 105 is secured by one end to the angle-lever 104 and by its other end to the catch 103 and acts with a constant tendency to pull the connecting-rod 102 and automatic stop-lever 100 upwardly, so as to bring the catch in front of the shoulder or collar 106 on the clutch trip-rod 107. The angle-lever 104 is pivoted at the junction of its arms to the frame E by means of the bolt 108 and by the outer end of its horizontal arm to the press-slide 45 by means of the bolt or pin 109.

Upon the right-hand side of the press-frame an ordinary clutch-lever 110 is pivoted by the stud 111, with its handle end projecting toward the front and its opposite end in position to act upon the clutch-pin 37 when the said end is depressed for engaging and withdrawing the clutch-pin in the ordinary manner. A spring 112 is secured by one end to the frame E and by its other end to the clutch-lever with a constant tendency to raise the handle end of the said lever and to depress its opposite end for withdrawing the clutch-pin to stop the press. Upon the handle end of the clutch-lever there is a shoulder 113, beveled on its under face and arranged in position for being engaged by the holding end of the clutch trip-rod 107, the said end being beveled back of its holding face. A spring 114 on the said trip-rod acts with a constant tendency to force said rod endwise into position for engagement with the shoulder 113 of the clutch-lever. This trip-rod is also pivotally connected with the handle end of the shipper-lever 115, that is pivoted by the bolt 116 to a bracket at the left-hand side of the press-frame and engages by its fork the shipper-collar 65 in connection with the friction-driver before described for driving the counter-shaft I.

When the clutch-lever is released to the action of the spring 112, its beveled rear end is depressed so as to engage the clutch-pin 37 and withdraw it for stopping the shaft F, while the driving-wheel G continues its movement. To start the shaft again, the handle end of the clutch-lever is depressed, when the beveled face of its shoulder 113 engages the beveled end of the clutch trip-rod and forces it back against the power of the spring 114 until the said beveled faces pass each other, and then the spring throws the said rod back again to engage the shoulder 113 and hold the clutch-lever away from the clutch-pin, so that its spring (not shown) acts to couple the driving-wheel with the shaft in the ordinary manner, and the shaft continues to revolve as long as the clutch-lever is thus held down. As the press-slide moves up and down the latch 103 on the upper end of the upright arm of the angle-lever continually moves from right to left; but so long as the latch is held down by the automatic stop-lever 100 its movement is an idle one, as it freely moves underneath the collar 106 on the clutch trip-rod without any engagement therewith. When the machine is properly adjusted, the end of the automatic stop-pin 98 bears on the edge of the stock 85, and the stock thus holds the latch 103 out of engagement with the clutch trip-rod 107 so long as the gripping-jaws 87 of the feed-slide are supplied with stock. Whenever the stock runs out, there is no longer anything to hold the outer end of the automatic stop-lever down, as the resisting stop-pin 98 moves freely in the space between the jaws 87. The jaws are provided with the transverse semicircular grooves, so as not to interfere with the inward movement of the stop-pin 98 even if the jaws came together. By thus releasing the stop-pin and lever 98 and 100 the shouldered end of the latch 103 moves upwardly under the influence of its spring 105, so that at the next outward movement of the upper end of the upright member of the angle-lever 104 the said latch engages the collar 106 on the clutch trip-rod and trips the clutch-lever 110 to stop the shaft by throwing the clutch-lever into action. Again, if the friction-driver from any cause has more load imposed on it than it can drive the shipper-collar 65 will be shifted in the manner before described, and thereby move the shipper-lever 115, so as to operate the clutch trip-rod 107 to release the clutch-lever and stop the machine. It will thus be seen that the trip-rod 107 may be automatically operated to release the clutch-lever by either one of two different mechanisms at two different parts of the machine.

To the under side of the press-slide I secure the subpress-slide 117, and upon the bed 35 of the frame I secure the die-bed 118. I have not shown any holes through the bed 35 of the press, but it will of course be provided with a vertical passage or passages to register with the holes in the die-bed. The rear part of the die-bed 118 is provided with guide-posts 119, and the subpress-slide 117 is provided with guiding-sockets 120, to which the guide-posts are fitted. To the under side of the subpress-slide 117 I secure the punch-holder 121. The under face of the subpress may, if desired, be grooved or recessed to receive a steel anvil-strip 122, Figs. 17 and 28, for a backing or abutment for the upper ends of the several punches. The punch-holder is provided with ordinary punch-sockets and set-screws to receive and hold the two blanking-out punches 123 and 124 and the hammers or plungers 125. The punch 124 is provided with a pilot-pin 126, and each of the hammers or plungers 125 is provided with long pilot-pins 127. I employ two piercing-punches 128, Fig. 28, and for convenience I secure both of the punches in a subpunch-holder 129 of a cylindrical form, and which subholder may be held in a round socket within the punch-holder by a set-screw in the ordinary manner of holding punches within their holder. The projecting lower end of the subpunch-holder 129 is slabbed off on one side to a half-cylinder and provided with a groove or recess 130 at the junction of its whole and half cylinder, and extending down from the said recess are the semicircular sockets 131 to receive the piercing-punches 128. The upper ends of these punches are provided with a flange 132, that enters the recess 130. A cap or segmental holder 133, having a rabbet at its upper end and semicircular sockets, (which rabbet and sockets correspond with the recess and sockets 130 and 131 as to fitting the punches 128,) is placed on the outer side of the said punches and held there by the ring 134 and its set-screw 135, whereby the piercing-punches are firmly and conveniently secured within the subpunch-holder, as best shown in Figs. 35 and 36. In Fig. 28 the cap or segmental holder 133 is left off in order to more clearly show the other parts.

The dies for coacting with the piercing-punches are formed in a cylindrical die-block 136, that is secured in the supplemental or upper die-bed 137, which die-bed 137 is secured in any suitable manner on the top of the die-bed 118, so that the lower end of the die-block 136 may rest on the lower die-bed 118 or on a steel block 217, Figs. 14 and 28, that is inserted in the said die-bed 118. At the right of this piercing die-block 136, in the same upper die-bed, are the two blanking-out dies 138 for coacting with the blanking-out punches 123 and 124. The die-block 136 is held in place by a set-rod 146, acted upon by a set-screw 147 at the front of the upper diebed, as shown in Fig. 14. The blanking-out punches and other parts are held therein by the same means, all of the rods and screws for this purpose being given the same reference-numerals.

The confronting faces of the main and supplementary die-beds are recessed or chambered out, as shown in Figs. 17 and 28, to make a passage-way for the nuts and to make room for the carrier and coacting parts. The blanking-out dies are made in the form of cylindrical blocks let into cylindrical holes in the upper die-bed and rest upon die-bases 139, which are mainly of cylindrical form, but are provided with shoulders 140 at their lower ends to rest upon corresponding shoulders in the holes of the upper die-bed, as shown in Fig. 28. The blanking-out dies also receive some support from the fixed back gage 203 at the rear of the passage-way for the blanks. The vertical thickness of each blanking-out die and its die-base taken together from the top of the blank as cut and forced down by the blanking-out punches to the lower end of the die-base is equal to some multiple of thickness of one nut-blank, whereby when the dies are filled with nut-blanks the under face of the lowermost blank will be substantially in the plane of the lower end of the die-bases 139, and the blank underneath the stack of blanks in the die will be free to pass on to the right through the space provided for such passage and without any liability of being caught or blocked by being partly in the die-base. In other words, one nut-blank will be pushed wholly out of the blanking-die and its base for every descent of the blanking-out punch. When the dies are taken out and ground off at the upper end to sharpen them, a washer (not shown) of a thickness equal to the amount of metal removed by grinding may be placed in the die-socket between the lower end of the dies 138 and their bases 139, so as to maintain the same vertical depth of the complete die as before. In order to prevent the end of the bar or stock 85 from being caught by the farther side or corner of the blanking-out die in case the end of the bar should dip downwardly a little, as it sometimes does, I incline the top face of the die upward, so as to make it the highest at the middle, as at 141, Fig. 28, which incline has a tendency to push the end of the stock upwardly as it is fed in, so that it will clear the farther upper corner of the die and insure its passage over the same without being caught thereon. The said incline 141 has no detrimental effect on the action of the blanking-out dies. Upon the top of the supplemental or upper die-bed is the combined cap and take-off 142 for the piercing punches and with a guide for the stock to guide it from the straightener before described to the said piercing punches and dies. A second guide 143 for the stock is also provided between the two blanking-out dies, as shown in Figs. 13 and 28. This second guide is loosely held in place upon the pins 218 and forced downwardly by the spring 219, so as to bear on the upper face of the stock passing through the said guide to frictionally hold the stock severed by the first blanking-die, as hereinafter described, from moving forwardly faster than it is forced along. Underneath the cap and take-off 142 there is mounted to slide longitudinally from front to rear the rear stock-holding slide 144 and front stock-holding slide 145, the same being arranged for bearing upon and holding the stock by its edges when the central holes for the nut-blanks are being pierced by the piercing-punches. Passing from rear to front through the die-bed is a sliding rod 148, having an arm 149 at its front end provided with an adjusting-screw 150, that bears on the end of the front stock-holding slide 145. The rear end of the sliding rod 148 is provided with a slotted head 151, in the slot of which head the lower arm of the T-lever 152 engages. The said lever is pivoted on the die-bed by the pin 153, Fig. 14, and an adjusting-screw 154 in the upper arm of the T-lever bears on the rear stock-holding slide 144. The main arm of the T-lever 152 is acted upon by a cam 155 on the counter-shaft I. The parts are so timed that the T-lever 152 is acted upon by the highest part of the cam 155 when the piercing-dies are in action to punch the central holes in the nut-banks. They are also so timed in relation to the feed-slide 79 that they hold the stock while the feed-slide moves to the left and open to allow the stock to feed freely when the slide 79 moves to the right, thus making the feed-grip and edge-holding grip act alternately. The rod 148 is free to slide in its mounting, so that an even pressure is exerted on the front and rear edges of the stock when the stock is being pierced by the punches 128. By adjusting the screws 150 and 154 the slides 144 and 145 may be adjusted so as to properly hold the stock firmly and also so as to properly center the stock with reference to the said punches.

The piercing-punches are so set as to pierce the central holes of two adjoining nut-blanks, and the first blanking-out die is set with its center a distance from the center of the adjacent piercing-punch equal to the width of two nut-blanks. The two blanking-out dies are set a distance from center to center equal to the width of two and a half nut-blanks, thus leaving an intervening table between said blanking-out dies wide enough for a nut-blank. For example, suppose the width of a nut-blank to be half an inch, then the piercing dies and punches are located a half inch apart from center to center, the second piercing die and punch and the first blanking-out die are located an inch apart from center to center and the two blanking-dies are located an inch and a quarter apart from center to center, and all the subsequent dies are located the same distance from center to center as the two blanking-out dies. This enables me to make two complete nuts at each revolution of the main shaft and at the same time leave plenty of stock for the proper support of the dies and punches, as well as to move the blanks in the peculiar manner hereinafter described and leave stock for a nut-blank between the blanking-out dies. The dies might be farther apart, but could not conveniently be closer together. When thus set the width of two and a half blanks from center to center, the space between two adjoining dies is equal to the width of one and a half nut-blanks measured at the central line of the dies, and if they should be set farther apart the distance should be equal to some multiple of one and a half nut-blanks—as, for example, the width of three nut-blanks instead of one and a half. As shown in Fig. 28, the distance between the second piercing-die and first blanking-out die is not as great as it should be.

The two swaging or crowning dies 156 and the two trimming-dies 157 are held in the die-bed 118 in a plane below the supplementary die-bed 137. For convenience of construction the under side of the bed 118 is recessed underneath the dies 156 and 157 to receive the die-rest or support 158, Fig. 28. The swaging-dies rest on a die-base 159 and the trimming-dies on a die-base 160, which die-bases in turn rest upon the die-rest 158. The swaging-dies are bored centrally to receive the tubular knock-outs 161, which knock-outs are forced upwardly by means of the springs 162, that rest by their lower ends on the die-rest 158, while the upper ends of the said springs bear against the under side of shoulders on the knock-outs in the ordinary manner of arranging such springs on similar knock-outs. In connection with the swaging or crowning dies and punches I employ pilot-pins 127, the same as I employ in connection with the trimming-dies. It is therefore necessary to bore the knock-outs centrally at their upper ends to receive the ends of the said pilot-pins. In order to keep these holes clear and prevent them from filling up, I bore them wholly through the knock-outs and also perforate the die-rest underneath the knock-outs. In Fig. 31 I have illustrated the knock-out in its depressed position in order to more clearly show the swaging or crowning die. In this position the lower end of the knock-out rests upon the die-rest 158. The swaging-punches 163 and trimming-punches 164 are held in the supplemental or upper die-bed 137 and held down by the cap 171. They are forced upwardly by means of springs 165. They are bored centrally for the passage of the long pilot-pins 127 on the hammers or plungers 125, that act on the upper ends of the punches 163 and 164 to force them downwardly to their work, while the springs 165 have a tendency to force the punches back again. The sockets or holders 166 for the punches 163 and 164 are held in place by set-rods 146 and set-screws 147. The swaging and trimming dies 156 and 157 are held by the same means. The lips or shoulders upon which the springs 165 rest at the lower ends of the sockets 166 may have a hexagonal passage for the punches 164 for properly guiding the said punches. The same construction may be followed for the swaging-punches 163. If desired, a lifting catch or pawl 167 may be secured to the punch-holder adjacent to the hammer or plunger 125 for the trimming-punches, as shown in Figs. 17 to 20. The said catch is mounted to slide laterally in a suitable bracket or holder 168 and is forced outward by a spring 169, Fig. 20. A shoulder 170 is formed on one side of the upper end of the trimming-punches for being engaged by the beveled nose of the said catch or pawl. As the hammers 125 descend from the position shown in Fig. 17 to that shown in Fig. 18 and come into engagement with the upper ends of the punches the spring 165 resists the downward movement of the punch with force enough to force back the pawl or catch 167 against the force of its spring until its nose is opposite the shouldered recess in the punch and snaps into engagement therewith. The hammer 125, pilot-pin 127, and trimming-punch 164 then all move downwardly together from the position shown in Fig. 18 to that shown in Fig. 19, forcing the finished nut 172, Fig. 19, through the trimming-die and shaving the edges thereof to convert the nut-blank 173, Fig. 18, into the finished nut 172, Fig. 19. As the press-slide rises to withdraw the hammer 125 the pawl or catch assists the spring in raising the punch, so as to insure of its being lifted, and after the stop-shoulder on the punch engages the cap 171 and limits the upward movement of the said punch the catch or pawl 167 yields and withdraws from the shouldered recess to release the punch for the farther upward movement of the hammer, as shown in Fig. 20.

At the right-hand end of the shaft I is the carrier-cam 173, grooved on each side, one of its grooved sides being shown in Fig. 4 and the other in Fig. 8. These grooves have two inclined portions and two concentric portions, whereby they are adapted to reciprocate a rack or slide and give a period of rest thereto between each stroke. Upon the right-hand side of the press-frame adjacent to the cam 173 is the carrier-bracket 201, within which two racks 174 and 175 are mounted and guided in suitable ways or guides and provided with pins or pins and rollers 178 within the grooves of the cam 173, so that said racks are reciprocated by the said cam. Upon the top of the carrier-bracket is the carrier crank-disk 177, mounted in suitable bearings and provided with a pinion 178, that engages with the crank-disk rack 174, as indicated in broken lines in Figs. 16, 21, 22, and 23, whereby one full stroke of the rack 174 imparts about one-half of a revolution to the said carrier crank-disk. In like manner the rack 175 engages a pinion 179, which pinion in turn engages the carrier slide-rack 180, that is mounted in the carrier-bracket to reciprocate from side to side of the machine at right angles to the racks 174 and 175, which move from front to rear.

The carrier 181 is provided with three full fingers, a half-finger, and a short finger, all projecting from the edge of the carrier and having inclined edges, so as to form four nut-holding pockets. All of the fingers are rabbeted on their under side, so that they do not wipe the top face of the several dies. The half-finger 182, the second and third full fingers 183, and the short finger 184 are each of them rabbeted on their top face also, as best shown in Figs. 24 and 25, Fig. 24 showing the carrier bottom side up. These fingers are all of them rabbeted upon the top, so that their upper face does not stand as high as the top face of a nut-blank received within the pockets between the fingers. The first full finger, however, is not thus rabbeted on the top. At its forward edge it is thinner than a nut-blank, and its top face slants upwardly, so that its rear edge 186 is thicker than a nut-blank and stands higher than does the top face of a nut-blank when lying between the fingers. In case two nut-blanks, one on top of the other, should by accident be caught in the pocket in front of the finger having the thin and thick edges the under blank would be moved along at the next forward movement of the nut-carrier, while the top blank would slide off from the other blank and up the inclined top face of the said finger 185, so as to be lifted high enough to clear the edge of the nut-blank in the next pocket without being caught on the edges of the said blank and blocking the machine. The carrier 181 is loosely mounted to slide from front to rear upon the top of the main carrier-slide 187, but held thereon, so as to necessarily move right and left with the said main slide. The projection 188 at the left-hand end of the main carrier-slide necessitates the movement of the carrier with the said slide toward the right, and the air-blast scrap-clearer 189 necessitates the movement of the carrier with the said slide toward the left. The rear portion of the carrier is provided with longitudinal ways 190, that are fitted to counter-ways in the front portion of the slotted carrier-slide 191, as most clearly shown in Fig. 23ª, while Fig. 17 shows how the carrier and slotted carrier-slide are held from moving up or down out of place by the die-bed 118 and the supplemental die-bed 137. The slotted carrier-slide is provided with inclined or oblique slots 192, (best shown in Fig. 16,) and in the die-bed 118 is a pin 193 for the guide-block 194, that is fitted to the said slots, so that whenever the slotted carrier-slide moves longitudinally on the bed and on the ways of the carrier and in the direction of its inclined slots the said slide also moves toward the front or rear and moves the carrier with it as to the front and rear movement. The carrier-slide and the carrier are moved right and left, or longitudinally, by means of the carrier-crank disk 177, the crank-pin 195 of which disk is connected to the main carrier-slide 187 by means of the adjustable pitman 196, and the stud 197 passes through one end of the said pitman into a lug or wing at the end of the main carrier-slide. The slotted carrier-slide 191 is reciprocated by the carrier-slide rack 180 and a similar pitman 198 and pins 199 and 200, mounted, respectively, in the slotted carrier-slide and the carrier-slide rack. When the carrier-cam is grooved in the particular form shown in Figs. 4 and 8, the parts will be so timed that the main carrier-slide 187 makes its movement to the right during a period of rest at the end of the rearward stroke of the carrier 181, which position of the carrier is shown in Fig. 16. This movement to the right of the main carrier-slide changes the said slide and carrier from the position shown in Fig. 16 to that shown in Fig. 21 without any change in position of the slotted carrier-slide. The slotted carrier-slide 191 makes its stroke to the right to impart the forward or withdrawal stroke of the carrier during a period of rest of the main carrier-slide at the right hand end of its stroke, thus changing the slotted carrier-slide and carrier from the position shown in Fig. 21 to that shown in Fig. 22 without any change in position of the main carrier-slide. The main carrier-slide makes its stroke to the left during a period of rest of the slotted carrier-slide at the right hand end of its stroke, and consequently when the carrier is drawn toward the front, thus changing the main slide and carrier from the position shown in Fig. 22 to that shown in Fig. 23 without any change in the position of the slotted carrier-slide. The slotted carrier-slide makes its stroke to the left during a period of rest of the main carrier-slide at the left hand end of its stroke, thus changing the position of the slotted carrier-slide and carrier from the position shown in Fig. 23 to that shown in Fig. 16 without any change in the position of the main carrier-slide. This imparts a regular four-motion movement to the carrier. This four-motion feed, however, is not essential, as it is only essential that the carrier move in a right line while it is in the act of transferring the nuts from one position to another, the direction of its movement when not thus transferring the nuts being wholly immaterial. By merely changing the grooves of the carrier-cam the carrier may be given a two-motion feed consisting of one movement in a straight path and one movement in a curved path, whereby it describes a semi-oval instead of a rectangular figure. Figs. 9ª and 9ᵇ show such a modification in the grooves of the carrier-cam 173ª. Fig. 9ª shows the groove on that side of the cam which drives the slotted carrier-slide, and Fig. 9ᵇ the groove on the opposite side of the same cam that drives the main carrier-slide. In the groove of Fig. 9ᵃ there is a concentric portion 220 for giving the slotted carrier-slide a period of rest, which concentric portion extends from the broken line or point 221 to the line 222. The groove then has an outwardly-extending eccentric portion 223, extended from the point indicated by the broken line 222 to the line 224, the first part of said portion being rather abrupt for moving the slotted carrier-slide quickly and the rest of the said portion more gradual for a slower movement of the said slide. From the point 224 a like eccentric portion 225 extends inwardly to the point 221, where it meets the concentric portion 220.

In Fig. 9ᵇ the cam-groove has an abruptly eccentric portion 229 extending from the broken line 226 inwardly to the broken line 227, where it meets a concentric portion 230, that extends to the broken line 228. A gradual outwardly-extending eccentric portion 231 extends from the concentric portion 230 at the point 228 to the point 226, where it meets the reversely-extending eccentric portion 229. When the slotted carrier-slide reaches the concentric portion 220 of the groove, Fig. 9ᵃ, the said slide is at rest to permit the carrier to move to the right for transferring the nuts. The eccentric portion 229 of the groove, Fig. 9ᵇ, then moves the main slide quickly to the right and gives the said slide a short period of rest at the right-hand end of the stroke, the slotted carrier-guide being at rest during the said right-hand stroke of the main slide and remaining at rest during the period of rest of the said main slide. The eccentric portion 231 of the groove, Fig. 9ᵇ, then acts to move the main slide slowly to the left, and simultaneously therewith the eccentric portions 223 and 225 of the opposite cam-groove move the slotted carrier-slide in reverse directions, whereby the combined movement of the main slide and slotted carrier-slide move the carrier in a curved path from the position shown in Fig. 21 to that shown in Fig. 16.

Back of that portion of the die-bed 118 on which the nut-blanks 202 fall from the blanking-out dies 138 is a fixed back gage 203, Fig. 16, and back of the trimming-dies 157 is a yielding back gage 204, pivoted to the die-bed by the pin 205 and forced forwardly by means of the spring 206, so as to project slightly into the path of the nuts as presented thereto by the carrier. A pin 207 in the die-bed and slot 208 in the yielding back gage permits the said gage to move backwardly and also limits its forward movement. When the hammers for the trimming-punches and the pointed pilot-pins 127, mounted in said hammers, descend and enter the central hole in the nut-blank over the trimming-die, this gage is holding the nuts a little farther to the front than the central position over the said trimming-die. The pilot-pin, however, has a tendency to push the nut-blanks back to their central position, so that they are pressed firmly against the edge of the yielding gage and turned axially on the pilot-pins sufficiently to bring their rear edge into a position parallel to the face of the said gage, thereby at the same time bringing the several sides of the hexagonal nut-blanks into a position coincident with the sides of the trimming-die. The movement of the carrier also acts to press the nut-blanks against the back gage 204 with a like tendency to square the nut with the trimming-die.

Underneath the combined cap and take-off 142, Fig. 13, by the side of the front holding-stock slide 145, is a sliding stop-gage 209 for gaging the position of the end of the bar or stock 85 when it is first put into the machine. A lever-handle 210 for this stop-gage is pivoted on the pin 211 and has a lug 212 that enters a notch in the top of the gage 209 near its outer end. The said lever-handle is also provided with an arm 213 and stop-lug 214. Depressing the lever-handle 210 into a horizontal position, as shown in Fig. 15, brings its arm 213 against the outer end of the stop-gage and forces the said gage inwardly, so as to project its inner end somewhat into the path of the stock adjacent to the piercing-dies, as shown in Fig. 15. By raising the outer end of the handle-lever the lug 212 pulls the gage back out of the way of the stock, the stop-lug 214 engaging the top of the cap 142 and limiting the movement of the said handle-lever to indicate when the gage is fully withdrawn.

I prefer to arrange the crank-pin 195 of the carrier crank-disk 177 upon a block 223, mounted in suitable guides and made adjustable by means of the adjusting-screw 224, so that the throw of the crank-pin may be adjusted as may be desired. I also prefer to make the blanking-out dies 138 larger when measured from front to rear than from any other two opposite sides, as shown in Fig. 13, so that they will measure more from front to rear than the width of the stock, and thus the complete cutting in two of the stock by the said die is insured. If the stock or bar is of exactly the proper width, the blanks cut by the said dies will be substantially uniform on all sides; but even if the bar is a little wider than necessary, and thus the nut-blanks have unequal sides, the difference in the amount of stock trimmed off from the several sides by the trimming-die will be so slight as not to have any appreciable effect on the finished nut as it leaves the trimming-die.

Referring now to the general operation of the machine upon the stock, it should be noted that the feed grip-cam 91 and the cam 155 for the T grip-lever—the first for grasping the sides of the stock 85 and the second for grasping the edges of the stock—act alternately and in immediate succession, so that one or the other of them will always be holding the stock. The machine and its clutch are so arranged as to stop the main shaft in the position to release the front and rear holding-stock slides 145 and 144 from the action of their cam 155 and to bring the feed grip-cam 91 into position for acting upon the gripping-jaws 87 and to carry the feed-slide forward for a part of its stroke. The release-handle 94 for the cam-ball 92 and lever 88 is then turned toward the front, as shown in Fig. 11, so as to release the jaws 87 from the pressure of the said cam 91 and lever 88. The stock 85 is then passed through the straightening-rollers 97, between the open feed grip-jaws and over the piercing-dies 136, until stopped by the hand-operated stop-gage 209, the said gage having been forced inwardly by hand. The lever 94 is then thrown back by hand into the position shown in Fig. 33 for again forcing the feed grip-jaws 87 upon the stock, and the lever 210 is raised to withdraw the hand-operated stop-gage 209. The clutch-lever 110 is then locked down to start the machine. The feed-slide then moves forward, carrying the stock far enough beyond the position determined by the hand-operated stop-gage 209 to complete the forward stroke of the feed-slide that was partially made when the machine was stopped. The front and rear stock-holding slides 145 and 144 grasp the stock by its edges, and the feed grip-jaws 87 release their hold on the stock ready for the feed-slide to make its backward or return stroke with open jaws. The press-slide descends and pierces two central holes in the stock, while the adjustable eccentric and pitman for the feed move the feed-slide actuator forward to throw the feed-slide back for a fresh hold on the stock. The stock 85 is then firmly grasped by the jaws 87, (the edge grip releasing its hold,) and when it is so grasped the adjustable eccentric 71 pulls the feed-slide actuator rearwardly and throws the feed-slide 79 to the right, thus carrying said slide, grip-jaws, and stock held therein to the right a distance equal to the length of stock required for two nut-blanks, and so on, feeding the stock the same distance for every revolution of the main shaft F. For convenience and clearness of description I will first describe the action of the piercing and blanking-out punches on the stock in connection with the diagrammatic view, Fig. 29. The lower ends of the said punches are shown at the upper part of the view and given the same reference-numerals as in the other figures of the drawings. The parts embraced by each bracket, with the exception of A, show at the top and bottom, respectively, the stock 85 as moved into the position for the action of the punches and then show the action of the punches thereon. The bracket A represents the first revolution of the press-slide; B, the second; C, the third, and D the fourth. In bracket A the stock is stopped by the hand-operated stop-gage 209 as not quite ready for piercing, because the said stop is set for an incomplete feed-stroke. When the hand-stop 209 is withdrawn and the machine started, the stock first moves into the position shown by the lower part of bracket A, and then two holes are punched by the two piercing-punches, as indicated by the two small circles. The two hexagonal figures at the right of the stock illustrate the position of the two blanking-out dies which the stock has not yet reached, and consequently these dies have no action on the stock. In bracket B the stock has been moved from its position in the bracket A, and as the press-slide descends two more round holes are pierced and the first blanking-out die acts to cut a blank from the end of the stock, as indicated by the left-hand hexagonal figure, thus leaving three round holes, cutting off a nut-blank and a little scrap 215, and leaving the end of the stock with a V-shaped notch. In bracket C the stock with the three round holes and notched end has been moved along another space, and then two more round holes are pierced and another nut-blank punched out, as indicated by the left-hand hexagonal figure, cutting the stock completely off, leaving at the left of the said severed stock the same three holes and a V-shaped notch, while at the right of the first blanking-out die and nut-blank there is a short piece of severed stock 216 with notched ends; but the stock has not yet been fed in far enough to reach the second blanking-out die.

In bracket D the stock has been moved from its lowermost position in bracket C one space, as shown by its uppermost position in bracket D. In thus moving along the short piece of stock 216 remained in the position shown in bracket C until it was pushed along by the stock 85, and now for the first time the stock is brought into position over both of the blanking-out dies, which punch out two nut-blanks, as indicated by the two hexagonal figures at the lowermost part of the bracket D. As this severed piece of stock 216 is forced into the second guide 143 it forces the guide upwardly a little against the spring 219 with sufficient friction to prevent the said stock from jumping forwardly under any jarring action of the machine. It may be here noted that this piece 216 at its outer corners is of a length equal to the width of a blank and a half, and it is for this reason that the blanking-out dies are a distance from each other from center to center equal to two and a half blanks, the feed being equal to the width of two blanks. When the first blanking-out punch 123 acts to blank out a nut, the stock is firmly held by the slides 144 and 145, so as to be properly centered without the employment of a pilot-pin; but the second blanking-out punch 124 acts upon a detached short piece of stock, so that it is not thus held. Besides this the stock is so cut that this detached piece is not fed forward quite far enough to bring its hole central with the second blanking-out punch and die. I therefore employ the pilot-pin 126 in the punch 124 to enter the hole in the detached short piece of stock and draw it along a little or otherwise move it to center it properly before the blanking-out punch begins to cut. In this fourth revolution of the shaft two round holes are pierced and two nut-blanks are cut out, leaving the main body of the stock with three round holes and a notched end, while one short piece of stock with notched ends and the regular scrap 217 are cut off. Each subsequent revolution of the main shaft gives the same action of the piercing and blanking-out punches and leaves the stock as represented in bracket D so long as the stock lasts and no interruption occurs. Making the blanking-out dies and punches of greater dimensions from front to rear than from side to side is very important in connection with this plan of cutting out two nut-blanks at one stroke of the press-slide. It will readily be seen that if even a thin piece of scrap should be left at one or both edges of the stock at the point where the first blanking-out die acts, as in the brackets C and D, the short piece of stock 216 would be connected, so as to make said piece move along with the rest of the stock without falling back to bring the confronting V-shaped ends together, as shown in the bracket D. The stock would in such an event be pushed along so far that the pilot-pin 126 of the punch 124 would not enter the central hole in the stock under it. Hence it is absolutely necessary to this method of blanking out two nuts at each stroke that the blanking-dies shall completely sever the stock. I intend to employ an air-blast in connection with the blanking-dies to remove the small pieces of scrap, &c. As the nuts fill the blanking-dies and drop through the same they fall upon the top of the die-bed 118 in front of the back gage 203. The carrier is operated by the mechanism before described to move it to its extreme left-hand position at a time when the carrier is farthest from the dies, as shown in Fig. 23. The slotted carrier-slide 191 is then moved toward the left, so as to force the carrier 181 toward the dies and toward the nut-blanks 202, Fig. 23, into the position shown in Fig. 16. In this position any nuts on the die-bed under the blanking-out dies will be received in the two left-hand pockets between the carrier-fingers. The rear gage 203 will prevent the said blanks from escaping from the said pockets. The main carrier-slide and the carrier are then moved to the right, as shown in Fig. 21, carrying the nut-blanks from the position indicated by broken lines in the said Fig. 21 to that shown by the hatcheled hexagonal figures, which represent a position immediately over the crowning or swaging dies. The press-slide, hammers, and long pilot-pins now descend, the pilot-pins entering the holes in the nut-blanks to center them as the hammers strike the upper ends of the swaging-punches and force them down upon the nut-blank and press the said blank into the said die to crown its lower face in the ordinary manner of swaging the faces of nuts in similar dies. In thus forcing the nut into the dies the knock-outs 161 are depressed against their springs, so that when the hammers withdraw the knock-outs under the influence of their springs force the nut-blanks out of the swaging-dies, leaving the upper ends of the knock-outs in the same plane as the top of the swaging-die and die-bed. While the hammers were acting to thus swage or crown the nut-blanks the slotted carrier-slide 191 moved toward the right from the position shown in Fig. 21 to that shown in Fig. 22, thereby withdrawing the carrier from the dies, as also shown in the said two views. The main carrier-slide 187 then moved to the left to bring the carrier again into position opposite the nuts under the blanking-dies, as shown in Fig. 23, and then the carrier is moved toward the said blanking-dies into the position shown in Fig. 16. In coming into this position two more nut-blanks are received into the two left-hand pockets of the carrier the same as before, and the blanks on the swaging-dies are received into the two right-hand pockets of the carrier, so that when the carrier next moves to the right, as before described, it not only carries two blanks to the swaging-dies, but also carries two swaged blanks to the trimming-dies 157 for finishing the nut by shaving its edges. The parts are so timed with reference to each other and the length of the pilot-pins that the latter are not fully withdrawn until the carrier moves rearwardly to receive the nut-blanks into its several pockets, whereby the proper engagement of the carrier with the several nut-blanks is insured.

For making square instead of hexagonal nuts it is only necessary to correspondingly change the shape of the several dies and punches and to change the carrier to the form shown in Figs. 26 and 27, in which the carrier is designated by $181^a$, the half-finger $182^a$, the second and third full fingers $183^a$, and the first full finger $185^a$, with the inclined top face and thick rear edge 186. The short finger at the right-hand end of the carrier is omitted. The air-blast scrap-clearer 189 has a longitudinal groove 220, Figs. 17 and 21, the said groove being also indicated in broken lines in Figs. 16, 22, and 23. From this groove two air-chutes 221 extend to the rear edge of the said scrap-clearer 189 and incline toward the right, as shown in Fig. 21. When this scrap-clearer 189 is secured to the main carrier-slide 187, the bottom of the groove is closed by the said slide. To the carrier-slide an air-tube 222 is attached, which tube communicates with the groove 220 by a suitable passage through the said carrier-slide. The air-blast tube is to be supplied with an air-blast from any convenient source of supply. The chutes 221 of this air-blast lie a little in front of the front or right-hand pockets in the nut-carrier, and when the carrier is moved to the left and up to the dies, as shown in Fig. 16, these chutes are adjacent to the left-hand trimming-die. As the carrier next moves toward the right the chutes move along in advance of the carrier in front of the trimming-dies, so that the air-blast therefrom removes all bits of scrap or other refuse from the trimming-dies, so as to prevent the same from marring the nuts.

An essential novelty of my machine is the construction and arrangement whereby two series of the same operations are being carried on simultaneously, so that two nuts are produced at each revolution of the main shaft. It is evident that this could be extended to more than two series of operations for making more than two nuts; but I wish it distinctly understood that the word two series of operations or two nuts for each revolution of the shaft applies clearly to more than two series and more than two nuts, because more than two cannot be made without making two. The same is true with reference to other features, like the spacing of the dies with the width of one or more nut-blanks between the blanking-out dies, whereby I produce a plurality of nuts instead of only one for each revolution of the main shaft.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. The combination of a series of nut-making dies with the press-slide, the punches for the said dies mounted on the said press-slide, the main shaft operatively connected with the said press-slide, feed mechanism for feeding the stock to the said dies and punches, a counter-shaft operatively connected with the said feed mechanism, a friction-driver mounted on the said main shaft, mechanism for connecting the said friction-driver with the said counter-shaft, and a stop mechanism for the main shaft connected with the friction-driver and operated thereby when the driver is overloaded, substantially as described.

2. The combination of the counter-shaft I with the feed-slide, the grip holding-jaws, the grip-lever, the feed grip-cam 91 on the said shaft, and means for reciprocating the said feed-slide independently of the said grip-cam, substantially as described.

3. The combination of the counter-shaft I with a feed-eccentric mounted thereon, a feed-slide actuator moving at right angles to the said shaft, a pitman for connecting the said eccentric and feed-slide actuator, the feed-slide moving in a line parallel to the said shaft, a pin and oblique-slot connection for the said feed-slide actuator and feed-slide, the grip-lever for closing the said jaws, and a grip-cam on the shaft I, substantially as described.

4. The combination of the reciprocating feed-slide with grip holding-jaws mounted upon the said slide, mechanism for reciprocating the said slide, and another mechanism for operating the gripping-jaws that is independent of the mechanism for reciprocating the said slide, substantially as described.

5. The combination of the main shaft and driving-wheel with the clutch and clutch-lever, means for locking the said clutch-lever in position for driving the said shaft through the said wheel, a spring for pulling the said clutch-lever in opposition to the said means for locking it, nut-making dies and punches, the said punches being operated through the said main shaft, feed mechanism having holding-jaws for grasping the stock, an automatic stop-lever arranged to bear with pressure on the stock within the feed grip holding-jaws, and connecting mechanism between the said automatic stop-lever and the means for locking the clutch-lever, whereby when the stock runs out the clutch-lever is released to stop the main shaft, substantially as described.

6. The combination of a series of nut-making dies with the press-slide, the punches for the said dies mounted on the said press-slide, the main shaft and driving-wheel operatively connected with the said press-slide, the clutch and clutch-lever, means for locking the said clutch-lever in position for driving the said shaft, a spring for pulling the said clutch-lever in opposition to the said means for locking it, the press-slide, the angle-lever pivoted on the press-frame and to the said press-slide, a spring-actuated latch on the vibrating end of the said angle-lever, the connecting-rod 102 secured by one end to the said latch, a feed-slide acting to feed the stock to the said dies and punches, and the automatic stop-lever 100 pivoted on the feed-slide and connected to the other end of the said connecting-rod for pressing upon the stock and for releasing the latch when the stock runs out, whereby the said latch engages the means for locking the clutch-lever to withdraw the same at the next movement of the vibrating end of the angle-lever under the upward movement of the press-slide, substantially as described.

7. The combination of a series of nut-making dies and punches with the main shaft operatively connected with the said punches, a feed mechanism for feeding stock to the said dies and punches, a counter-shaft operatively connected with the said feed mechanism for driving it, a friction-driver on the said main shaft operatively connected with the said counter-shaft to drive it, a spring-pressed clutch-lever, the clutch trip-rod 107, for locking the spring-pressed clutch-lever in position for driving the main shaft, the spring 114 for holding the said clutch trip-rod in its locking position, and two different and independent mechanisms for pulling the said rod against the force of its spring to release the clutch-lever, one of the said mechanisms being connected with and operated by the said friction-driver, and the other being connected with and operated by the said feed mechanism, substantially as described.

8. The combination of a series of nut-making dies and punches, with the main shaft operatively connected with the said punches, the clutch trip-rod for locking the spring-pressed clutch-lever in position for driving the main shaft, the spring 114 for holding the said clutch trip-rod in its locking position, a friction-driver mounted on the said main shaft for driving other parts, a feed-slide through which the stock passes, shipper mechanism operated through the said friction-driver to withdraw the clutch trip-rod, and automatic stop mechanism in connection with the feed-slide operated by the running out of the stock to also act on the same clutch trip-rod to withdraw it, whereby the said rod is withdrawn whenever the friction-driver becomes overloaded and is also withdrawn whenever the stock runs out, substantially as described.

9. The combination of the feed grip holding-jaws with the feed grip-lever, the feed-cam, the adjustable cam-ball for the said grip-lever and cam, and means for holding the cam-ball in its extended position and for releasing it when desired, substantially as described.

10. The combination of the feed grip holding-jaws, with means for forcing the said jaws toward each other upon the stock, and the automatic stop-pin 98 mounted to slide within the holder for the said jaws for normally bearing on the edge of the stock, the said holding-jaws being transversely recessed to permit the said automatic stop-pin to enter in between the said jaws when the stock runs out, substantially as described.

11. The combination of the feed-slide with the holding-jaws for the stock mounted on the said slide, the feed grip-lever, the feed-cam, the adjustable releasing cam-ball mounted on the said feed grip-lever, and the hand-operated stop-gage for gaging the end of the bar when inserting it within the said jaws for their gripping action, substantially as described.

12. The combination of automatic feed mechanism, with the piercing and blank-out dies and punches, and a hand-operated stop-gage for gaging the stock relatively to the stroke of the said feed at the start, and for being withdrawn when the said automatic feed is started, substantially as described.

13. The combination of the piercing die and punch with the front and rear holding stock-slides, means for pressing the front one of the said slides against the front edge of the stock and means for simultaneously pressing the rear one of the said slides against the rear edge of the stock during the action of the said piercing-punch, substantially as described.

14. The combination of the front and rear holding stock-slides, with the sliding rod 148 connected with one of the said slides, means for forcing the said sliding rod and connected slide in one direction and the other one of the said slides in the opposite direction, and the adjusting devices 150 and 154 between the said two slides and actuating devices, substantially as described, whereby the said slides exert an equal pressure on opposite edges of the stock and may be adjusted to properly center the stock.

15. The combination of the front and rear holding stock-slides, with the T-lever 152, the sliding rod 148 connected at one end with one of the said slides and at the other end to the lower arm of the said T-lever, the upper arm of the said T-lever being connected with the other one of the said slides, and means for operating the said T-lever, whereby the one lever simultaneously operates both of the said slides with substantially the same pressure, substantially as described.

16. The combination of the feed-slide, means for reciprocating the said slide, feed grip holding-jaws mounted on the said feed-slide, the front and rear holding stock-slides mounted on the die-bed, and means for operating the said feed grip holding-jaws and the said front and rear holding stock-slides alternately, whereby the stock is always firmly held by one or the other of the said gripping devices, substantially as described.

17. The combination of the piercing dies and punches for piercing two holes at each stroke of the slide, with two nut-blanking-out dies and punches in the same line of feed, the said blanking-out dies being separated from each other a distance equal to the width of one nut-blank, all coacting with each other, substantially as described.

18. The nut-blanking-out die arranged in the path of the stock, and having its top face inclined gradually upward toward the middle of the die from the edge on that side from which the stock is fed, for about one-half the width of a nut-blank, substantially as described.

19. The combination of two coacting nut-blanking-out dies and punches arranged side by side in the line of the feed passage-way for the stock, with an intervening table for the stock between the said dies equal to the width of one nut-blank, substantially as described.

20. The combination of two nut-blanking-out dies and punches with a guide for the stock as it approaches the first die, an intervening table between the said two dies equal to the width of one nut-blank, a second guide loosely mounted on the die-bed, and a spring for frictionally pressing the said guide upon the piece of stock that is left between the said blanking-out dies, substantially as described.

21. The blanking-out dies and punches made wider from front to rear than the width between any other two opposite sides, substantially as described.

22. The combination of two blanking-out dies and their punches arranged in the same line of feed and acting to simultaneously make two nut-blanks, the said dies and punches being wider from front to rear than from any other two opposite sides, and far enough apart to leave stock for a nut-blank between the two nut-blanks as cut by said dies, substantially as described.

23. The combination of two hexagonal nut-blanking-out dies and their punches acting together for cutting out two hexagonal blanks at each stroke of the punch-slide, the said dies being separated from each other a distance from center to center equal to the width of two and a half nut-blanks, for leaving a blank piece of stock for another nut-blank between the said two blanking-out dies, substantially as described.

24. The combination of two nut-piercing dies and their punches with two nut-blanking-out dies and their punches acting together for cutting out two nut-blanks at each stroke of the punch-slide, leaving a severed and pierced piece of stock between the said two blanking-out dies long enough for another nut-blank, feed mechanism for feeding the stock directly to the said piercing-dies and the first blanking-out die and indirectly pushing the pierced and severed piece over the second blanking-out die, and a pilot-pin in the punch for the said second blanking-out die for drawing the said pierced and severed piece farther along before blanking out, substantially as described.

25. The combination of the main die-bed 118, the crowning-die and trimming-die mounted therein, with the supplemental or upper die-bed, the piercing-die, blanking-out die, crowning-punch, and trimming-die punch mounted in the said upper die-bed in longitudinal alinement with each other and over the said crowning and trimming dies, substantially as described.

26. The combination of the main die-bed 118 with the crowning-die mounted therein, the sliding knockout within the said crowning-die having a central perforation, the punch for the said crowning-die, and a pilot-pin in connection with said punch arranged to enter the perforation in the said knockout, substantially as described.

27. The combination of the main die-bed 118 with the crowning-die and its knockout having the central perforation, the supplemental upper die-bed, the perforated crowning-punch mounted to slide in the said bed, the punch-slide, a hammer for the said crowning-punch, and a pilot-pin in the said hammer for entering the central perforations in the said crowning-punch and knockout, substantially as described.

28. The combination of the main die-bed 118 with the trimming-die mounted therein, the supplemental upper die-bed, the trimming-punch mounted in the said die-bed and having a central perforation through it, the punch-slide, the hammer for the said trimming-punch, and the pilot-pin mounted in the said hammer for extending through the central hole in the said trimming-punch, substantially as described.

29. The combination of the main die-bed 118, with the trimming-die mounted therein, the supplemental upper die-bed, the trimming-punch mounted in the said upper bed, a spring for holding the said punch normally in an elevated position, and the punch-slide having a hammer for depressing the said trimming-punch, substantially as described.

30. The combination of the die-bed 118 with the trimming-die mounted therein, the supplemental upper die-bed, the trimming-punch mounted therein, a spring for normally holding the said punch away from the said trimming-die, a reciprocating hammer for forcing the said trimming-punch into its die, and a lifting-catch moving with the said hammer for engaging the said trimming-punch and starting it away from the said trimming-die as the said hammer makes its return stroke, substantially as described.

31. The combination of the main die-bed 118 with a plurality of crowning-dies and trimming-dies mounted therein, the supplemental upper die-bed, a plurality of piercing and blanking-out dies mounted in the said upper die-bed, a plurality of crowning and trimming punches also mounted in the said upper die-bed in alinement with the said piercing and blanking-out dies, a plurality of piercing and blanking-out punches for the said piercing and blanking-out dies and means for simultaneously reciprocating all of the said several punches, substantially as described.

32. The combination of the main die-bed 118, with the supplemental upper die-bed, the said beds being formed with a passage-way for the nuts between them, and the blanking-out dies mounted in the said upper die-bed over the said passage-way for nuts, a die-base underneath and in continuation of the said blanking-out die, the combined blanking-out die and base being made of a length above the said passage-way relative to a multiple of the thickness of the nut-blanks, and also separable for the insertion of packing after grinding to maintain the said length, substantially as described.

33. The combination of a plurality of duplicate blanking-out dies and their punches with a plurality of duplicate crowning dies and punches, a plurality of duplicate trimming dies and punches, a carrier and mechanism for operating the said carrier whereby when two blanking-out, crowning and trimming dies are employed, the carrier transfers two nuts from under the two blanking-out dies to the two crowning-dies, and two nuts from the two crowning-dies to the two trimming-dies, substantially as described.

34. The combination of the crowning-die and its punch with a pilot-pin centrally mounted with reference to the said punch for entering the central hole of the nut being crowned in the said crowning-die, the trimming-die and its punch by the side of the said crowning-die, and a carrier for transferring the nuts from the said crowning-die to the said trimming-die, the parts being so timed that the said pilot-pin does not let go of the nut over the crowning-die until the carrier takes hold of the said nut, substantially as described.

35. The carrier having one of its fingers on the right-hand side of one pocket, (in the position shown,) made thicker than the nut on its left-hand edge, and thinner than the nut on its right-hand edge, the top face being inclined, substantially as described.

36. The combination of the trimming-die mounted in the main die-bed with its punch mounted in the supplemental upper die-bed and centrally perforated, a spring for raising the said punch, a reciprocating hammer, a pilot-pin mounted on the said hammer and fitted to the central hole in the said punch for passing therethrough into the nut in the trimming-die, substantially as described.

37. The combination of the nut-trimming die and punch with the main carrier-slide, mechanism for reciprocating the said slide in front of the said trimming-die, and an air-blast scrap-clearer mounted on the said slide and having an air-chute opening at the edge that faces the said die, substantially as described.

38. The combination of the carrier-cam with the rack 174 for the carrier crank-disk, the carrier-crank disk and its pinion connecting the said disk with the said rack, the main carrier-slide, and the adjustable pitman connecting the said crank disk and slide, substantially as described.

39. The combination of the carrier-cam with the rack 175 for the carrier-slide rack, the carrier-slide rack 180, a pinion 179 connecting the said two racks, the main carrier-slide, the carrier mounted on the said main slide and moving longitudinally therewith but free to move transversely thereto, the slotted carrier-slide having longitudinal ways to which the carrier is fitted and oblique slots, fixed pins for engaging the said oblique slots, a pitman for connecting the said slotted carrier-slide with the said slide-rack 180, and mechanism for imparting a reciprocating movement to the said main carrier-slide, substantially as described.

40. The combination of the main carrier-slide with the carrier mounted thereon and moving longitudinally therewith but free to move transversely thereto, the slotted carrier-slide extending parallel to the said main carrier-slide and fitted to the carrier so as to slide thereon but locked against independent transverse movement, the said slotted carrier-slide having also the inclined slots, means engaging the said slots for acting in opposition thereto, and means for moving the said slotted carrier-slide in opposite directions for moving the carrier transversely to the main carrier-slide, substantially as described.

41. The combination of the main carrier-slide with the carrier mounted thereon, the slotted carrier-slide extending parallel to the said main slide, the said parts being connected for necessitating the simultaneous movement of the main slide and carrier in the longitudinal direction of the said slide and for necessitating a movement of the carrier in the transverse direction thereto under the oblique movement of the said slotted carrier-guide, mechanism for reciprocating the main carrier-slide, and mechanism for moving the said slotted carrier-guide for reciprocating it in the direction of its inclined slots, substantially as described.

42. The combination of the main carrier-slide with the carrier and the slotted carrier-slide, all mounted together substantially as described, two different sets of operating mechanisms, and two adjustable pitmen connecting the said operating mechanisms respectively with the said main slide and slotted carrier-slide, substantially as described.

43. The combination of the main shaft with a series of nut-making dies and punches, the said punches being operatively connected with the said main shaft, the friction-driver mounted on the said main shaft, the counter-shaft I, connecting mechanism for imparting the motion of the said friction-driver to the said counter-shaft, feed mechanism and carrier mechanism both driven by the said counter-shaft whereby the feed and carrier mechanism will stop when overloaded while the motion of the main shaft and connected punches continues, substantially as described.

44. The combination of the counter-shaft with the feed-slide, the feed grip holding-jaws mounted on the said feed-slide, the front and rear holding stock-slides, the carrier mechanism, the feed-eccentric, feed grip-cam, the cam for the said holding stock-slides, and the carrier-cam, the said feed-eccentric and the several cams all mounted on the said counter-shaft, substantially as described.

45. The combination of the press-slide 45 carrying the several punches, the main shaft for operating the said press-slide, the friction-driver mounted on the said main shaft, the counter-shaft I, connecting mechanism for imparting the motion of the said friction-driver to the said counter-shaft, a series of dies mounted on the bed of the press, feed mechanism and carrier mechanism both driven by the said counter-shaft through the said friction-driver, whereby the feed and carrier mechanism will stop when overloaded, and the motion of the main shaft and press-slide will continue, substantially as described.

46. The combination of duplicate series of nut-making dies and punches with the frame and press-slide, moving in ways in the said frame, the toggle-lever mounted in trunnionblocks to move in alinement with the said ways, the upper and lower toggle-levers connecting the said main toggle-lever with the said frame and press-slide, the main shaft operatively connected with the said main toggle-lever, feeding mechanism, holding mechanism, and carrier mechanism operated through the said main shaft substantially as described.

47. The combination of the main carrier-slide with the carrier and slotted carrier-slide, all mounted together substantially as described, mechanism for operating the said slotted carrier-slide, a crank-disk and pitman for operating the main carrier-slide, and means for adjusting the crank-pin of the said crank-disk, substantially as described.

48. The combination of the main carrier-slide with the carrier and slotted carrier-slide, all mounted together substantially as described, mechanism for operating the said slotted carrier-slide, a crank-disk having an adjustable crank-pin, and an adjustable pitman connecting the said crank-pin and main carrier-slide, substantially as described.

CHARLES P. WETMORE.

Witnesses:
M. S. WIARD,
C. E. RUSSELL.